US012639686B2

(12) United States Patent
Mathew

(10) Patent No.: US 12,639,686 B2
(45) **Date of Patent: *May 26, 2026**

(54) CREATION AND MAINTENANCE OF HIERARCHICAL DATA OBJECTS

(71) Applicant: LINEN SOFTWARE INC., Fremont, CA (US)

(72) Inventor: Jacob Mathew, Fremont, CA (US)

(73) Assignee: LINEN SOFTWARE INC., Fremont, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 18/618,927

(22) Filed: Mar. 27, 2024

(65) Prior Publication Data

US 2024/0320648 A1     Sep. 26, 2024

Related U.S. Application Data

(60) Continuation-in-part of application No. 17/975,212, filed on Oct. 27, 2022, now Pat. No. 11,961,060, which is a division of application No. 17/009,777, filed on Sep. 2, 2020, now Pat. No. 11,488,127.

(60) Provisional application No. 62/894,972, filed on Sep. 3, 2019.

(51) Int. Cl.
*G06Q 20/20*          (2012.01)

(52) U.S. Cl.
CPC .................................... *G06Q 20/20* (2013.01)

(58) Field of Classification Search
CPC ...... G06Q 20/20; G06Q 10/067; G06F 16/00; G06F 16/9024

USPC ........................................................ 705/16
See application file for complete search history.

(56) References Cited

U.S. PATENT DOCUMENTS

| | | | | |
|---|---|---|---|---|
| 7,853,503 B2 * | 12/2010 | Solberg | ................. | G06Q 40/02 |
| | | | | 705/35 |
| 8,447,755 B1 * | 5/2013 | Melbourne | ............ | G06F 16/21 |
| | | | | 707/715 |
| 9,002,845 B1 * | 4/2015 | Melbourne | ............ | G06F 16/21 |
| | | | | 707/736 |
| 10,475,117 B2 * | 11/2019 | Chao | ...................... | G06Q 40/00 |
| 2008/0091491 A1 * | 4/2008 | Thorpe | ................. | G06Q 10/06 |
| | | | | 707/805 |
| 2010/0030781 A1 * | 2/2010 | Wong | ................. | G06F 21/6227 |
| | | | | 707/E17.046 |

* cited by examiner

*Primary Examiner* — Garcia Ade
(74) *Attorney, Agent, or Firm* — Yantra Patents LLC; Anand P Narayan

(57)          ABSTRACT

Implementations described herein relate to methods, systems, and computer-readable media to create and maintain hierarchies. In some implementations, a method may include displaying, on a user interface, a hierarchy graph that includes a plurality of nodes, wherein each of the nodes is associated with a corresponding data structure in a database table, and wherein each of the nodes is associated with a set of first attributes and a set of second attributes; detecting an indication of a change to connectivity of a first node of the plurality of nodes; in response to detecting the indication of the change to the connectivity of the first node, determining a change to the first attributes of one or more modified nodes of the plurality of nodes; modifying the first attributes in a database that correspond to the one or more modified nodes; and displaying a modified hierarchy graph on the user interface.

20 Claims, 23 Drawing Sheets

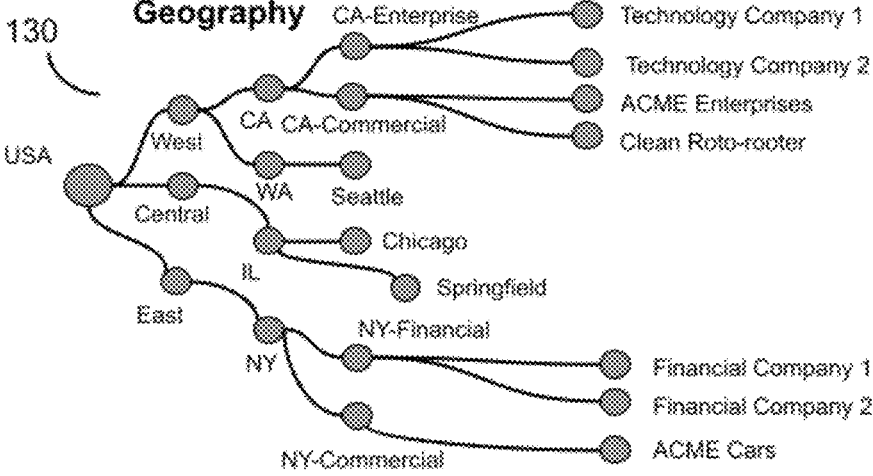
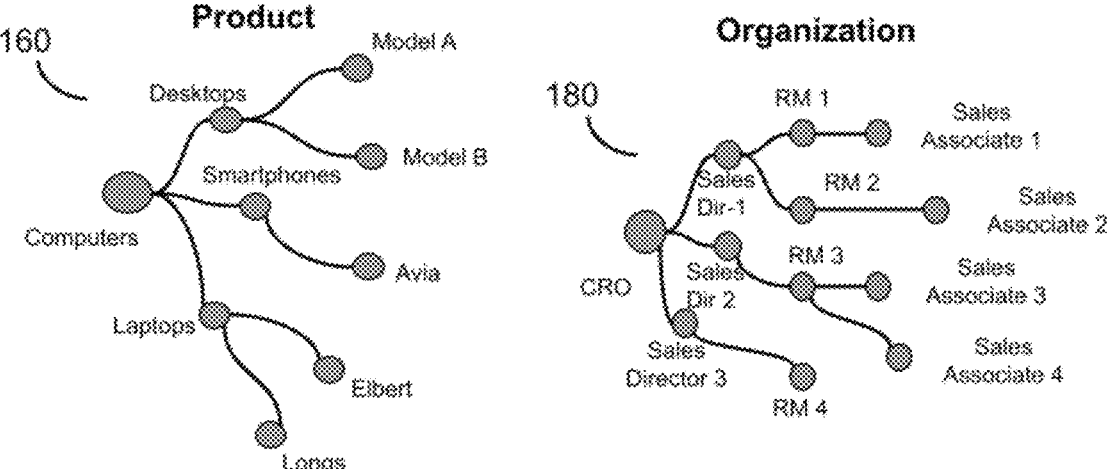
FIG. 1C

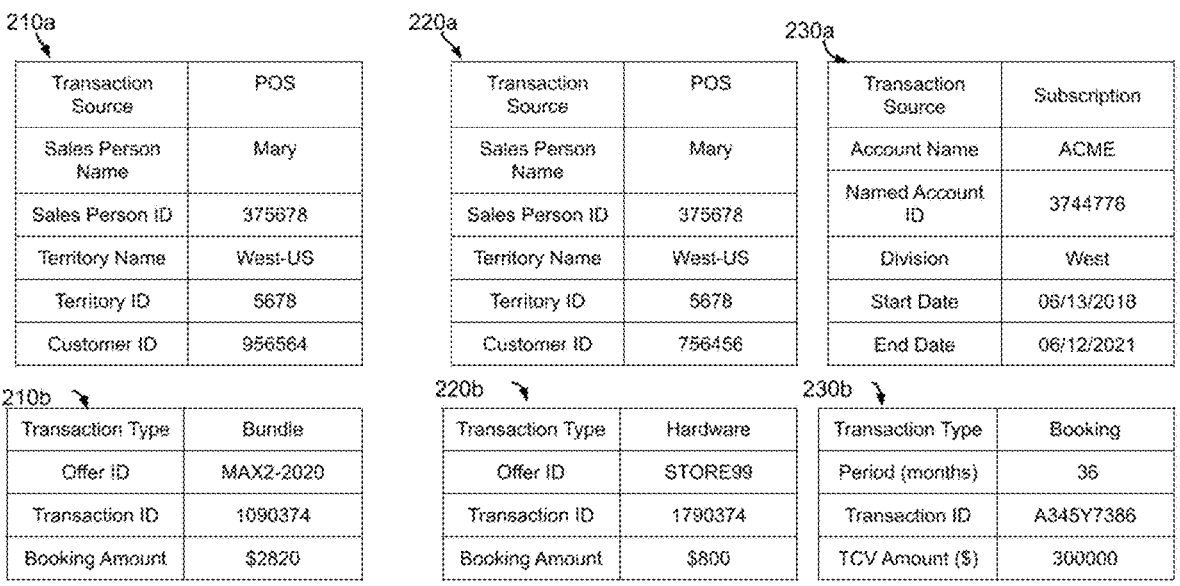

210a

| Transaction Source | POS |
|---|---|
| Sales Person Name | Mary |
| Sales Person ID | 375678 |
| Territory Name | West-US |
| Territory ID | 5678 |
| Customer ID | 956564 |

220a

| Transaction Source | POS |
|---|---|
| Sales Person Name | Mary |
| Sales Person ID | 375678 |
| Territory Name | West-US |
| Territory ID | 5678 |
| Customer ID | 756456 |

230a

| Transaction Source | Subscription |
|---|---|
| Account Name | ACME |
| Named Account ID | 3744776 |
| Division | West |
| Start Date | 06/13/2018 |
| End Date | 06/12/2021 |

210b

| Transaction Type | Bundle |
|---|---|
| Offer ID | MAX2-2020 |
| Transaction ID | 1090374 |
| Booking Amount | $2820 |

220b

| Transaction Type | Hardware |
|---|---|
| Offer ID | STORE99 |
| Transaction ID | 1790374 |
| Booking Amount | $800 |

230b

| Transaction Type | Booking |
|---|---|
| Period (months) | 36 |
| Transaction ID | A345Y7386 |
| TCV Amount ($) | 300000 |

FIG. 2

Figure 3B:
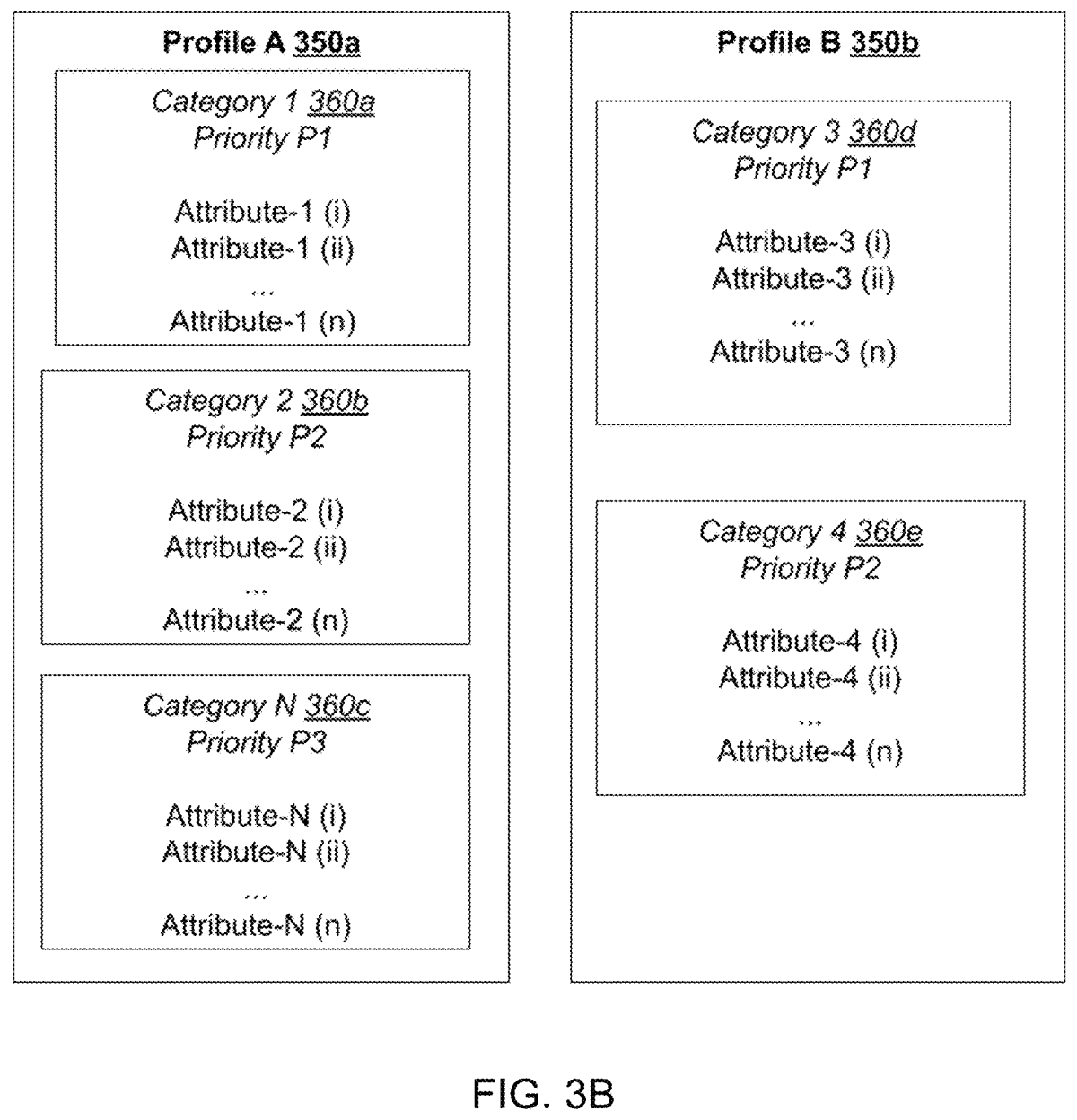

Profile A 350a

*Category 1 360a*
*Priority P1*

Attribute-1 (i)
Attribute-1 (ii)
...
Attribute-1 (n)

*Category 2 360b*
*Priority P2*

Attribute-2 (i)
Attribute-2 (ii)
...
Attribute-2 (n)

*Category N 360c*
*Priority P3*

Attribute-N (i)
Attribute-N (ii)
...
Attribute-N (n)

Profile B 350b

*Category 3 360d*
*Priority P1*

Attribute-3 (i)
Attribute-3 (ii)
...
Attribute-3 (n)

*Category 4 360e*
*Priority P2*

Attribute-4 (i)
Attribute-4 (ii)
...
Attribute-4 (n)

FIG. 3B 400    410     PROFILES  ⟶  430

420

CATEGORIES

| | SFDC | ERP | Subscription | POS | Acq | Invoice | ... | ATTRIBUTES |
|---|---|---|---|---|---|---|---|---|
| Deal | P1 | P1 | | | | | | Deal ID |
| Named Account | P2 | P2 | P2 | P3 | | P3 | | Named Account ID |
| Route to Market | | P4 | | | | | | Route to Market, Channel Partner Flag |
| Federal | | P3 | | | | | | Market Type |
| Managed Service | | P5 | P4 | | | | | Customer Type, Sale Type, Sold to Customer |
| Geo Based | P4 | P6 | P5 | P4 | | P4 | | BU ID, BU Geo ID, Country, Region |
| Exception | | | P1 | P2 | P2 | | | Sold To, Order Type, Bill To |
| Sales Motion | P3 | | P3 | | | | | Sales Motion, Cross Sell, Upsell |
| Distributor | | | | P1 | | | | Sold To, Reporting Distributor, Bill To |
| Acquisition Type | | | | | P1 | | | Acquisition Type, Source Order Type |
| PO | | | | | P3 | | | PO Type, PO Customer |
| Product | | | | | P4 | | | BU, Tech Group, Product Family |
| Revenue Type | | | | | | P1 | | Invoice Type, RevRecFlag, Amortize Flag |
| Multi Year | | | P6 | | | P2 | | Multi Year Flag, Software Flag, Service Flag |
| ... | | | | | | | | |

| Provide template to user 550 | → | User uploads file with records formatted based on template 555 | → | Validate uploaded file 560 |

Create Database Table(s) 570

Display Hierarchy Graph 575

610

| Node ID | Node Level | Parent Node | Node descriptor |
|---------|-----------|-------------|-----------------|
| 1 | L1 | - | US |
| 2 | L2 | 1 | North |
| 3 | L2 | 1 | South |
| 4 | L2 | 1 | East |
| 5 | L2 | 1 | West |
| 6 | L3 | 2 | Montana |
| 7 | L3 | 2 | Ohio |

615

Figure 6B:
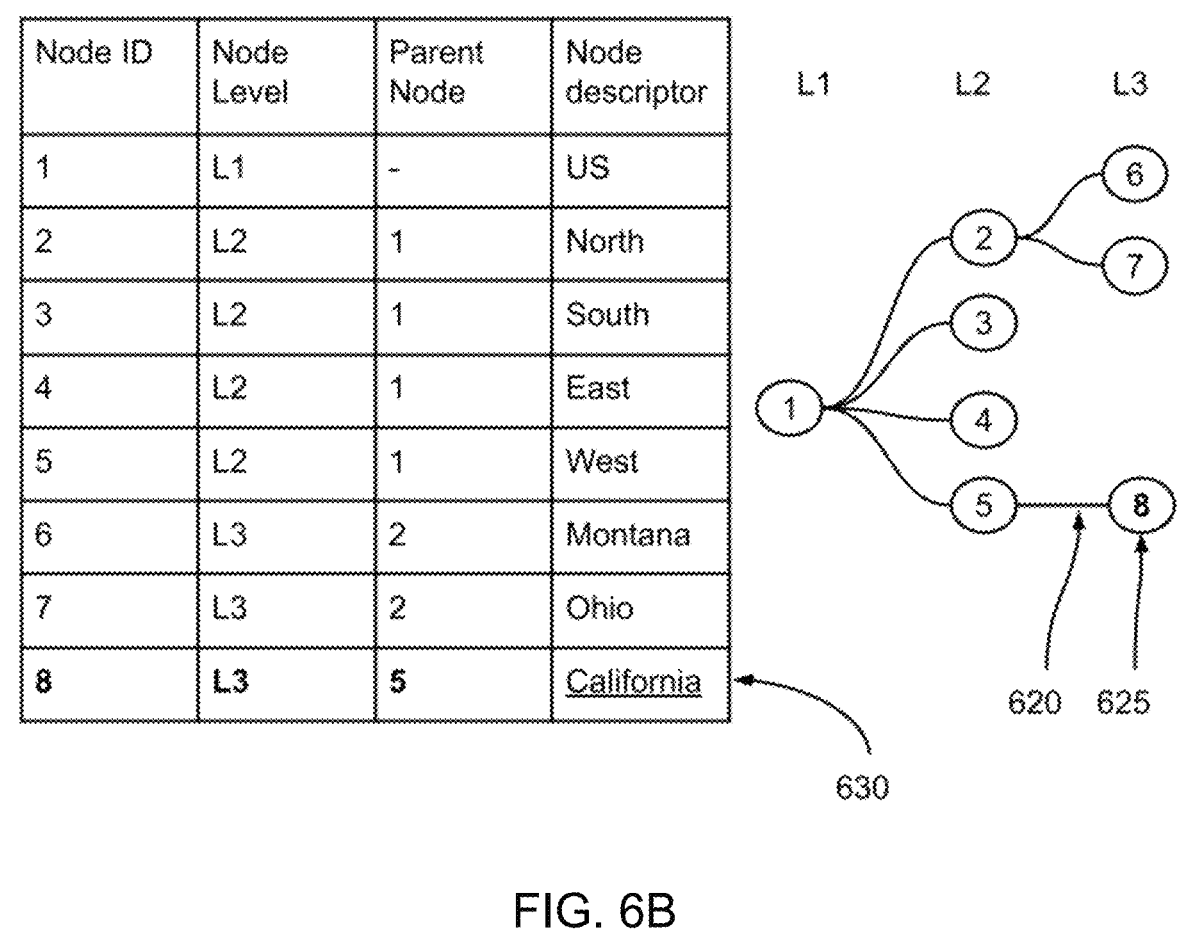

| Node ID | Node Level | Parent Node | Node descriptor |
|---------|-----------|-------------|-----------------|
| 1 | L1 | - | US |
| 2 | L2 | 1 | North |
| 3 | L2 | 1 | South |
| 4 | L2 | 1 | East |
| 5 | L2 | 1 | West |
| 6 | L3 | 2 | Montana |
| 7 | L3 | 2 | Ohio |
| 8 | L3 | 5 | California |

Receive text file that includes hierarchy 710

Validate data elements  715

Determine hierarchy from elements 720

Load nodes from predetermined number of levels into memory 725

Display hierarchy graph 730

735

Detect selection of a node from set of displayed nodes 740

Load second attributes associated with selected node 745

Load first attributes of next lower level of nodes 750

Graphically display lower level of nodes 755

Display a text window with attributes of selected node 760

770

Display hierarchy graph  775

Detect indication of change of connectivity of node  780

Determine changes to selected one or more attributes of one or more nodes 785

Modify data structures in database to selected one or more attributes of one or more nodes 790

Display modified hierarchy graph 795

210a

| Transaction Source | POS |
| --- | --- |
| Sales Person Name | Mary |
| Sales Person ID | 375678 |
| Territory Name | West-US |
| Territory ID | 5678 |
| Customer ID | 956564 |

210b

| Transaction Type | Bundle |
| --- | --- |
| Offer ID | MAX2-2020 |
| Transaction ID | 1090374 |
| Booking Amount | $2820 |

910b

| Transaction Type | Hardware |
| --- | --- |
| Offer ID | MAX2-2020 |
| Transaction ID | 1090374-1 |
| Booking Amount | $900 |

912b

| Transaction Type | Voice service |
| --- | --- |
| Offer ID | MAX2-2020 |
| Transaction ID | 1090374-2 |
| Booking Amount | $1200 |

914b

| Transaction Type | Data Service |
| --- | --- |
| Offer ID | MAX2-2020 |
| Transaction ID | 1090374-3 |
| Booking Amount | $720 |

230a

| Transaction Source | Subscription |
| --- | --- |
| Account Name | ACME |
| Named Account ID | 3744778 |
| Transaction ID | A345Y7386 |
| Start Date | 06/13/2018 |
| End Date | 06/12/2021 |

230b

| Transaction Type | Booking |
| --- | --- |
| Period (months) | 36 |
| Transaction ID | A345Y7386 |
| TCV Amount ($) | 300000 |

920b

| Transaction Type | Booking |
| --- | --- |
| Year ID | 1 |
| Transaction ID | A345Y7386-1 |
| ACV ($) | $100000 |
| Start Date | 06/13/2018 |
| End Date | 06/12/2019 |

922b

| Transaction Type | Booking |
| --- | --- |
| Year ID | 2 |
| Transaction ID | A345Y7386-2 |
| ACV ($) | $100000 |
| Start Date | 06/13/2019 |
| End Date | 06/12/2020 |

924b

| Transaction Type | Booking |
| --- | --- |
| Year ID | 3 |
| Transaction ID | A345Y7386-3 |
| ACV ($) | $100000 |
| Start Date | 06/13/2020 |
| End Date | 06/12/2021 |

FIG. 9A

CREATION AND MAINTENANCE OF HIERARCHICAL DATA OBJECTS

CROSS-REFERENCE TO RELATED APPLICATIONS

This application is a continuation in part of U.S. patent application Ser. No. 17/975,212, titled 'SYSTEMS AND METHODS FOR ASSIGNING ATTRIBUTION WEIGHTS TO NODES', filed 27 Oct. 2022, now U.S. Pat. No. 11,961, 060, which is a divisional application under 35 U.S.C. 120 of U.S. application Ser. No. 17/009,777, titled 'SYSTEMS AND METHODS FOR ASSIGNING ATTRIBUTION WEIGHTS TO NODES', filed Sep. 2, 2020, now U.S. Pat. No. 11,488,127, which claims priority to U.S. Provisional Patent Application No. 62/894,972, filed Sep. 3, 2019, titled "PROFILE AND METADATA BASED DISTRIBUTED COMMISSION CREDITING SYSTEM." The contents of the above applications are incorporated by reference herein in their entirety.

TECHNICAL FIELD

Embodiments relate generally to creation and maintenance of hierarchical data objects, and to generation and maintenance of hierarchies that include nodes.

BACKGROUND

Some computer systems utilize hierarchy graphs that include nodes such as agent nodes and/or territory nodes that are part of an ordered hierarchy. The nodes may be utilized for various computational operations. The attribution weights may be, for example, referral credits for site visits determined in an online published content context, or a transaction or sales credit determined based on a sales transaction. The attribution weights are sometimes to be determined for overlay nodes, based on secondary credits that are to be determined. As the number of rules and transactions increase, management of rules, efficient processing of nodes and transaction records, and sequential triggering of rules can become prohibitively expensive computationally.

SUMMARY

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes displaying, on a user interface, a hierarchy graph that includes a plurality of nodes, where each of the nodes is associated with a corresponding data structure in a database table, and where each of the nodes is associated with first attributes and second attributes; detecting an indication of a change to connectivity of a first node of the plurality of nodes; in response to detecting the indication of the change to the connectivity of the first node, determining a change to the first attributes of one or more modified nodes of the plurality of nodes; modifying the first attributes in a database that correspond to the one or more modified nodes; and displaying a modified hierarchy graph on the user interface. Other embodiments of this aspect include corresponding computer systems, apparatus, and computer programs recorded on one or more computer storage devices, each configured to perform the actions of the methods.

Implementations may include the computer-implemented method where detecting the indication of the change may include detecting an indication of an addition of a new node to the hierarchy graph. Detecting the indication of the change may include detecting a change in value of a parent node for the first node. The computer-implemented method may include: determining a modified parent value for the first node; determining whether there is a change in a level associated with the first node; based on a determination that there is a change is the level associated with the first node, adjusting a current level of the first node; and recursively adjusting a level of all nodes at levels lower than a level of the first node. Each record may include an enumeration of the first attributes and the second attributes; validating the plurality of records included in the file; creating the database table based on the plurality of records; determining a hierarchy graph based on the database table; loading nodes associated with a predetermined number of levels of the hierarchy into memory; and displaying the hierarchy graph that includes the nodes associated with the predetermined number of levels. Loading the nodes may include loading into memory the first attributes of a predetermined number of levels of nodes. The computer-implemented method may include: detecting a selection of a second node of the nodes included in the displayed modified hierarchy graph; loading, into memory, the second attributes associated with the selected second node; loading, into the memory, the first attributes of a next lower level of nodes; displaying graphically the lower level of nodes; and displaying, on a text window, the second attributes of the selected second node. Loading the second attributes associated with the selected second node occurs by overwriting the second attributes in memory of a previously selected node with the attributes of the selected second node. Implementations of the described techniques may include hardware, a method or process, or computer software on a computer-accessible medium.

In some implementations, the system also includes a memory with instructions stored thereon; and a processing device, coupled to the memory, the processing device configured to access the memory and execute the instructions, where the instructions cause the processing device to perform operations may include: displaying, on a user interface, a hierarchy graph that includes a plurality of nodes, where each of the nodes is associated with a corresponding data structure in a database table, and where each of the nodes is associated with first attributes and second attributes; detecting an indication of a change to connectivity of a first node of the plurality of nodes; in response to detecting the indication of the change to the connectivity of the first node, determining a change to the first attributes of one or more modified nodes of the plurality of nodes; modifying the first attributes in a database that correspond to the one or more modified nodes; and displaying a modified hierarchy graph on the user interface. Other embodiments of this aspect include corresponding computer systems, apparatus, and computer programs recorded on one or more computer storage devices, each configured to perform the actions of the methods.

Implementations may include the system where detecting the indication of the change may include detecting an indication of an addition of a new node to the hierarchy graph. Detecting the indication of the change may include detecting a change in value of a parent node for the first node. The operations further may include: determining a modified parent value for the first node; determining whether there is a change in a level associated with the first node; based on a determination that there is a change is the level associated with the first node, adjusting a current level of the first node; and recursively adjusting a level of all nodes at levels lower than a level of the first node. The operations further may include: may include prior to displaying the hierarchy graph: receiving, at a processor, a file that includes a plurality of records associated with a hierarchy, where each record may include an enumeration of the first attributes and the second attributes; validating the plurality of records included in the file; creating the database table based on the plurality of records; determining a hierarchy graph based on the database table; loading nodes associated with a predetermined number of levels of the hierarchy into memory; and displaying the hierarchy graph that includes the nodes associated with the predetermined number of levels. The operations further may include: detecting a selection of a second node of the nodes included in the displayed hierarchy graph; loading, into memory, the second attributes associated with the selected second node; loading, into the memory, the first attributes of a next lower level of nodes; displaying graphically the lower level of nodes; and displaying, on a text window, the second attributes of the selected second node. Implementations of the described techniques may include hardware, a method or process, or computer software on a computer-accessible medium.

One general aspect includes a non-transitory computer-readable medium with instructions stored thereon, where the instructions cause a processing device to perform operations that may include displaying, on a user interface, a hierarchy graph that includes a plurality of nodes, where each of the nodes is associated with a corresponding data structure in a database table, and where each of the nodes is associated with first attributes and second attributes; detecting an indication of a change to connectivity of a first node of the plurality of nodes; in response to detecting the indication of the change to the connectivity of the first node, determining a change to the first attributes of one or more modified nodes of the plurality of nodes; modifying the first attributes in a database that correspond to the one or more modified nodes; and displaying a modified hierarchy graph on the user interface. Other embodiments of this aspect include corresponding computer systems, apparatus, and computer programs recorded on one or more computer storage devices, each configured to perform the actions of the methods.

Implementations may include the non-transitory computer-readable medium where detecting the indication of the change may include detecting an indication of an addition of a new node to the hierarchy graph. Detecting the indication of the change may include detecting a change in value of a parent node for the first node. The operations further may include: determining a modified parent value for the first node; determining whether there is a change in a level associated with the first node; based on a determination that there is a change is the level associated with the first node, adjusting a current level of the first node; and recursively adjusting a level of all nodes at levels lower than a level of the first node. The operations further may include: may include prior to displaying the hierarchy graph: receiving, at a processor, a file that includes a plurality of records associated with a hierarchy, where each record may include an enumeration of the first attributes and the second attributes; validating the plurality of records included in the file;

creating the database table based on the plurality of records; determining a hierarchy graph based on the database table; loading nodes associated with a predetermined number of levels of the hierarchy into memory; and displaying the hierarchy graph that includes the nodes associated with the predetermined number of levels. The operations further may include: detecting a selection of a second node of the nodes included in the displayed hierarchy graph; loading, into memory, the second attributes associated with the selected second node; loading, into the memory, the first attributes of a next lower level of nodes; displaying graphically the lower level of nodes; and displaying, on a text window, the second attributes of the selected second node. Implementations of the described techniques may include hardware, a method or process, or computer software on a computer-accessible medium.

BRIEF DESCRIPTION OF THE DRAWINGS

FIG. 1C illustrates example hierarchy graphs, in accordance with some implementations.

FIG. 2 illustrates an example transaction record, in accordance with some implementations.

FIG. 3B depicts example crediting profiles, crediting categories, and attributes utilized in hierarchical processing of transaction data records, in accordance with some implementations.

FIG. 4A depicts an example hierarchical structure (table) for transaction data records, in accordance with some implementations.

FIG. 6B illustrates example hierarchy table modifications, in accordance with some implementations.

FIG. 9A depicts example transaction record data synthesis, in accordance with some implementations.

DETAILED DESCRIPTION

Figure 1A:
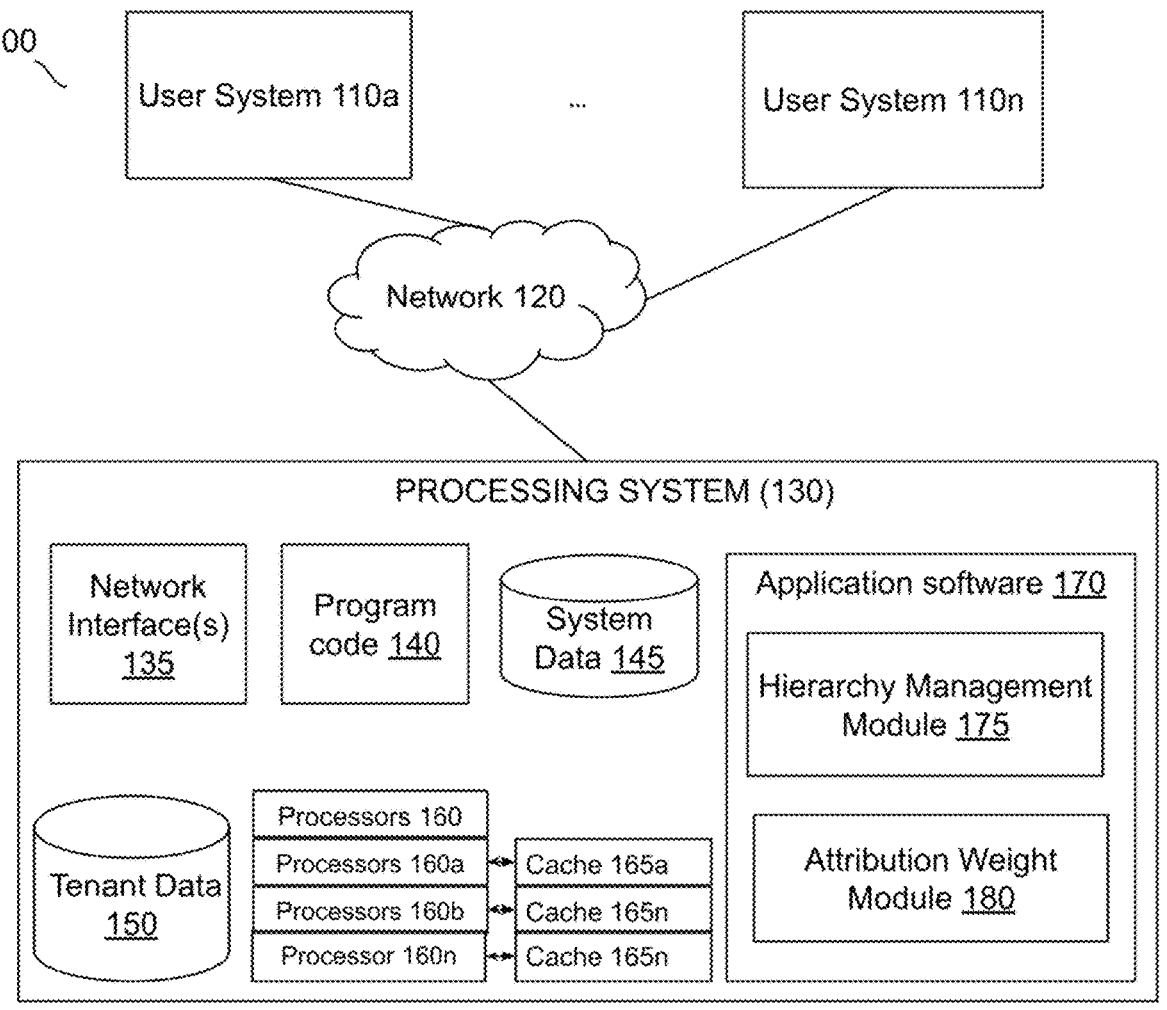
FIG. 1A is a diagram of an example system environment to assign attribution weights to nodes, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be implemented in connection with other embodiments whether or not explicitly described.

Computer systems are utilized to store, manage, and analyze various types of data that commonly include both unstructured data, where data elements bear no relation to one another, as well as structured data that are defined by a hierarchy, and where data elements are connected to one another. Examples of structured data include an organizational hierarchy of employees, a product hierarchy that represents a range of a company's products and/or services. etc. Data elements within a hierarchy are often advantageously represented as nodes that are connected to other nodes via defined relationships, e.g. parent, child, peer, etc. A relationship between nodes in a hierarchy may be characterized by a relationship between the nodes, how or where nodal values are stored, or by another indication that the nodes are associated with different levels in the hierarchy. The hierarchy defined by structured data may be equivalent to a tree having one root or top-level node, a set of distinct trees having many roots, a set of interconnected trees each with their own roots, or some other graph or set of nodes and connections arranged in levels.

Some computer applications can entail the use of attribution weights that are associated with one or more nodes. For example, attribution weights may be utilized to represent a sales (transaction) credit that is determined based on predetermined rules that are utilized to specify the sales credit to be provided to one or more sales agents, support staff, management staff, etc. based on a sales transaction successfully conducted by the sales agent. In another example, attribution weights may be utilized to represent a referral credit to be assigned automatically to content providers and/or content publishers associated with one or more links (hyperlinks) that a user clicks on before completing an online transaction and/or viewing online content.

Rules and rules engines are commonly utilized in conjunction with nodes for determining various data values that are associated with the nodes. The rules can utilize properties associated with the nodes as well as additional data values (attributes) to determine one or more attribution weights associated with the nodes. In a complex enterprise system, rule conflicts and rule redundancy can arise due to a large number of users constructing rules. An efficient audit mechanism for rules can help resolve rule conflicts and reduce rule redundancies.

In enterprise settings, transaction volume can be on the order of millions, or even a billion transactions, and determining attribution weights associated with the nodes based on specified rules can present a computationally intensive task. Sequential firing of rules in a single sequence, as conventionally performed, to determine attribution weights can be prohibitive computationally, when a number of rules runs into the tens of thousands, and transaction data records are on the order of millions or billions.

A technical problem in the software arts is efficient construction of rules and efficient computation of attribution weights based on specified rules and attributes derived from transaction data. Efficient operation of a rules engine can provide savings of time, computational resources, and power.

FIG. 1A is a diagram of an example system environment to create and maintain hierarchical data objects. FIG. 1A illustrates an example system environment 100, in accordance with some implementations of the disclosure. FIG. 1A and the other figures utilize similar (like) reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system environment 100 (also referred to as "system" herein) includes user systems 110, which include a variety of computer systems associated with a particular enterprise. Each of the subsystems can include a set of networked computers and devices. User system 110 can also include other subsystems not depicted, as they may pertain to the particular enterprise.

User systems 110a-110n are connected to a processing system 130 via network 120.

FIG. 1A illustrates a block diagram of an environment 100 wherein a service for the creation and maintenance of hierarchical data objects might be used. Environment 100 may include user systems 110, network 120, and processing system 130. Processing system 130 may include one or more network interface(s) 135, processors 160 (processors 160a, 160b, . . . , and 160n,) coupled to respective cache memory 165a, 165b, and 165n, application software 170, tenant data store 150, system data store 145, and program code 140. Processing system 130 may be implemented as a cloud-based system that is supplied and hosted by a third-party provider, and is accessible to users via a variety of connected devices.

Application software 170 may include a hierarchy management module 175 and an attribution weight module 180. In other implementations, environment 100 may not have all of the components listed and/or may have other elements instead of, or in addition to, those listed above.

User system 110 may include any machine, system, or set of machines, systems that are used by an enterprise. For example, any of user systems 110 can include handheld computing devices, mobile devices, servers, cloud computing devices, laptop computers, workstations, and/or a network of computing devices. As illustrated in FIG. 1, user systems 110 might interact via a network 120 with a processing system that provides a service, which is system 130.

System data store 145 and tenant data store 150 may utilize captive storage and/or cloud based storage. In some implementations, on-demand database services may be utilized. The data store may include information from one or more tenants stored into tables of a common database image to form a multi-tenant database system (MTS). A database image may include multiple database objects. A relational database management system (RDMS) or the equivalent may execute storage and retrieval of information against the database object(s).

In some implementations, an open source object oriented database may be utilized that is configured for unlimited database size. A max table size of about 32 TB, about 64 TB, or about 128 TB may be supported. The database can support JSON and XML storage along with primitive, structured and composite data types, and enables table partitioning, advanced indexing, parallelization and nested transactions.

In some implementations, the database supports PL/PGSQL, Python, stored procedures, function, and data wrappers, along with support for international characters and full text search.

Application software 170 may include a framework for applications of processing system 130 that operate system components such as the hardware and/or software, e.g., the operating system. Application software 170 may include a hierarchy management module 175 and an attribution weight module 180 that enable creation, managing and executing one or more applications developed by a service provider of the processing system, users associated with management of user systems 110, users accessing the processing system via user systems 110, and/or other third party application developers accessing the processing system 130.

Access to user systems 110 and processing system 130 may be controlled by permissions (permission levels) assigned to respective users. For example, when an employee or contractor associated with user system 110a is interacting with processing system 130, user device(s) of the employee or contractor is provided access on the basis of permissions associated with that employee or contractor. However, an administrator associated with user system 110a may be provided additional access privileges based on access privileges allotted to that administrator. In user systems with a hierarchical organization level, users at a certain permission level may have access to applications, data, and database information accessible to a lower permission level user, but may not be provided access to certain applications, database information, and data accessible to a user at a higher permission level. Thus, users can have different capabilities with regard to accessing and modifying application and database information, depending on a user's security or permission level.

Network 120 is any network or combination of networks of computing devices that communicate with one another. For example, network 120 can be any one or any combination of a LAN (local area network), WAN (wide area network), telephone network, wireless network, point-to-point network, star network, token ring network, hub network, or other appropriate configuration.

Processing system 130 may be connected to user systems 110 using TCP/IP and use other common Internet protocols to communicate, such as HTTP, FTP, AFS, WAP, etc. Users may access processing system 130 by utilizing different platforms and frameworks, e.g. by using single-page client applications that use HTML and TypeScript.

An application execution environment as described herein can be any software environment that supports execution of a software application. For example, an application execution environment may be an operating system (e.g., Linux, Windows, Unix, etc.), a hypervisor that supports execution of one or more virtual machines (e.g., Xen®, Oracle VM Server, Microsoft Hyper-V™, VMWare® Workstation, VirtualBox®, etc.), a virtual computer defined by a specification, e.g., a Java Virtual Machine (JVM), an application execution container (e.g., containers based off Linux CGroups, Docker, CoreOS, or the like), a process executing under an operating system (e.g., a UNIX process), etc. In some implementations, the application execution environment may be a software application, e.g., that is configured to execute on server hardware.

Figure 1B:
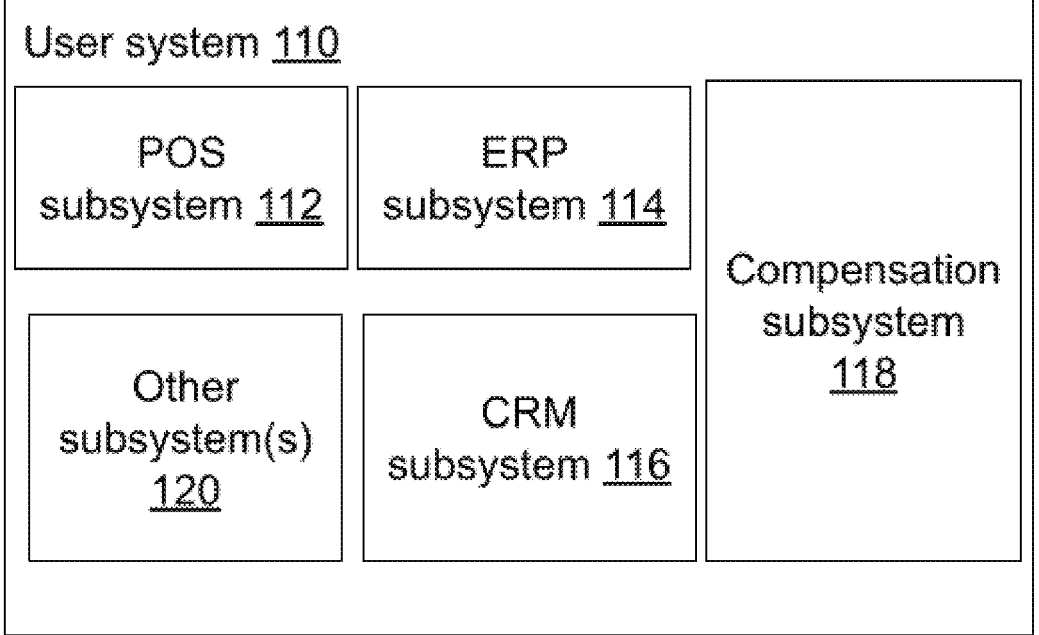
FIG. 1B is a diagram that depicts different entities that interact in an enterprise process, in accordance with some implementations.

FIG. 1B is a diagram that depicts different entities that interact in an enterprise process, in accordance with some implementations.

As companies grow, complexities increase in offers and sales organizations that may be assigned to cover different product categories, geographical areas, types of customer(s), types of sales, etc. As depicted in FIG. 1B, an organization that operates in multiple geographical regions and offers for sale to customers a wide range of products and services can utilize a variety of subsystems for the management of transaction and customer data across the organization.

For example, an organization may operate a POS subsystem (112) across its showrooms and retail locations which captures transaction data that relates to its retail customers. The POS subsystem can include a network of POS devices that are used to record the products or services included in a customer transaction, calculate one or more taxes due on the transaction, generate a transaction total, accept payment, generate a receipt, and create a record of the transaction. In some implementations, POS systems can include software components, hardware components, and a payment processor component.

A customer relationship management (CRM) subsystem (116) may be utilized by the organization for management of prospective and/or current customers. Some organizations may implement an Enterprise Resource Management (ERP) subsystem (114) which includes multiple computing devices and processes for the gathering, consolidation, and organization of business data through an integrated software suite. In some implementations, the ERP subsystem includes software applications for the automation of business functions like production, sales quoting, accounting, etc.

The organization can also collaborate with partners for joint ventures, which can be operated with its own sales organization. A different sales organization may be utilized for renewals, while some may be responsible for new customer acquisitions. Rebates, service level agreements, warranties could also affect rules that govern attribution credit based on actual performance post-sales. The organization may also utilize external channel partners and distributors who may utilize their subsystems for capturing and processing transaction data.

In addition to complexities arising from the subsystem utilized to process the transaction data, complexities also arise from different types of contracts and/or sales models utilized. For example, subscription based sales pose additional challenges, since the contract value is realized over multiple reporting periods, with changes. Similarly, promotion based sales, bundled sales also present additional processing challenges for the assignment of attribution weights.

A set of rules that govern attribution credit for various employee efforts may have to take into account the complexities of the transactions. As the set of rules becomes large, and transaction data increases, rule governance can be compromised leading to rule conflicts and a potential breakdown of automated rules processing. This can result in lost sales opportunities, compensation leakage, increased expenses, and potential legal and other challenges by employees.

Computing efforts to determine this real-time and/or near real-time can also pose challenges, which can affect efficiency of networked systems, where data values determined in one computer system are required in another separate computer system.

FIG. 1C illustrates example hierarchy graphs, in accordance with some implementations.

FIG. 1C includes a depiction of a geography hierarchy graph 130, a product hierarchy graph 160, and an organization hierarchy graph 180. In addition to providing a visual depiction of a structure of the entities, the hierarchy graph can also be utilized for structured data processing that includes nodes included in the hierarchy.

As depicted in FIG. 1C, the geography hierarchy can be utilized to record in a structured manner the allocation of a total market to different segments, and wherein each node in the hierarchy is associated with a particular coverage area.

A node, in this context, represents an entity that can hold a value and links to other nodes, thereby creating a structured, tree-like formation. In hierarchies, nodes can represent various levels of information or decision points, which are connected in a manner that reflects their relationship and order of precedence.

For example, application of policies to certain branches of nodes, inheriting properties of associated nodes can be enabled since the nodes can be operated on, e.g., by Boolean operations.

Nodes in Boolean operations play a pivotal role in managing hierarchies, especially in various data processing applications. At its core, a Boolean operation involves using Boolean logic—true or false (1 or 0)—to manipulate sets or to express logic gates. Hierarchies can be understood in the context of nodes and Boolean operations and can be utilized to define a relationship between nodes, and also refer to the structure and manipulation of data or logic in a way that reflects a hierarchical relationship, such as in a binary tree, decision-making processes, or in the structuring of complex systems.

Operations, e.g., Boolean operations, such as AND, OR, and NOT, can be used to manipulate or evaluate the data contained within these nodes or to control the flow of logic through the hierarchy.

Nodes and Boolean operations can interact in hierarchical structures in many ways. For example, decision trees are a form of hierarchy, where nodes represent decision points where Boolean operations can dictate the path taken through the tree. For example, a node could represent a question (a condition) that is answered with either true (yes) or false (no), guiding the next step in the process based on Boolean logic. Similarly, a hierarchical database or a nested data structure, Boolean operations can be used to filter data through nodes based on certain criteria. Each node in the hierarchy may represent a data point that can be evaluated as true or false against a given condition, allowing for the efficient filtering and retrieval of information.

The combination of nodes and Boolean logic in hierarchies allows for the creation of efficient, structured systems that can handle complex decision-making and data processing tasks. By leveraging the hierarchical structure, systems can minimize the processing time and resources required for operations, since the hierarchy naturally guides the flow of logic and data.

Nodes, when used in conjunction with Boolean operations, provide a powerful mechanism for structuring and manipulating hierarchies in data and logic. This interplay is foundational in computer science and related fields, enabling efficient processing, decision making, and information structuring.

Hierarchies can also play a crucial role in enterprise planning, serving as a fundamental structure for organizing information, resources, processes, and decision-making protocols. In the context of an enterprise, hierarchies help in establishing a clear chain of command, delineating responsibilities, and facilitating efficient communication and workflow across various levels of the organization. The utility of hierarchies in enterprise planning spans several key areas, including organizational structure, resource allocation, strategic planning, and information management.

FIG. 2 illustrates an example transaction record, in accordance with some implementations.

In this illustrative example, data from two separate POS based transactions are depicted.

As part of a first transaction record (210), data records (210*a*) include data about the source of the transaction ("POS"), a sales person name ("Mary"), a sales person identifier ("375678"), a territory name ("West-US") territory identifier ("5678"), and a customer ID ("956564"). Data records (210*b*) include details about a transaction type ("Bundle"), an offer identifier ("MAX2-2020"), a transaction identifier ("1090374"), and a booking amount ("$2820").

As part of a second transaction record (220), data records (220*a*) include data about the source of the transaction ("POS"), a sales person name ("Mary"), a sales person identifier ("375678"), a territory name ("West-US") territory identifier ("5678"), and a customer ID ("756456"). Data records (220*b*) include details about a transaction type ("Hardware"), an offer identifier ("STORE99"), a transaction identifier ("1790374"), and a booking amount ("$800").

The examples in FIG. 2 are provided for illustrative purposes, and as can be appreciated, transaction data records can include a broad variety of data types and values, depending on the specific use case, source of the transaction data, applications, configuration, etc.

Figure 3A:
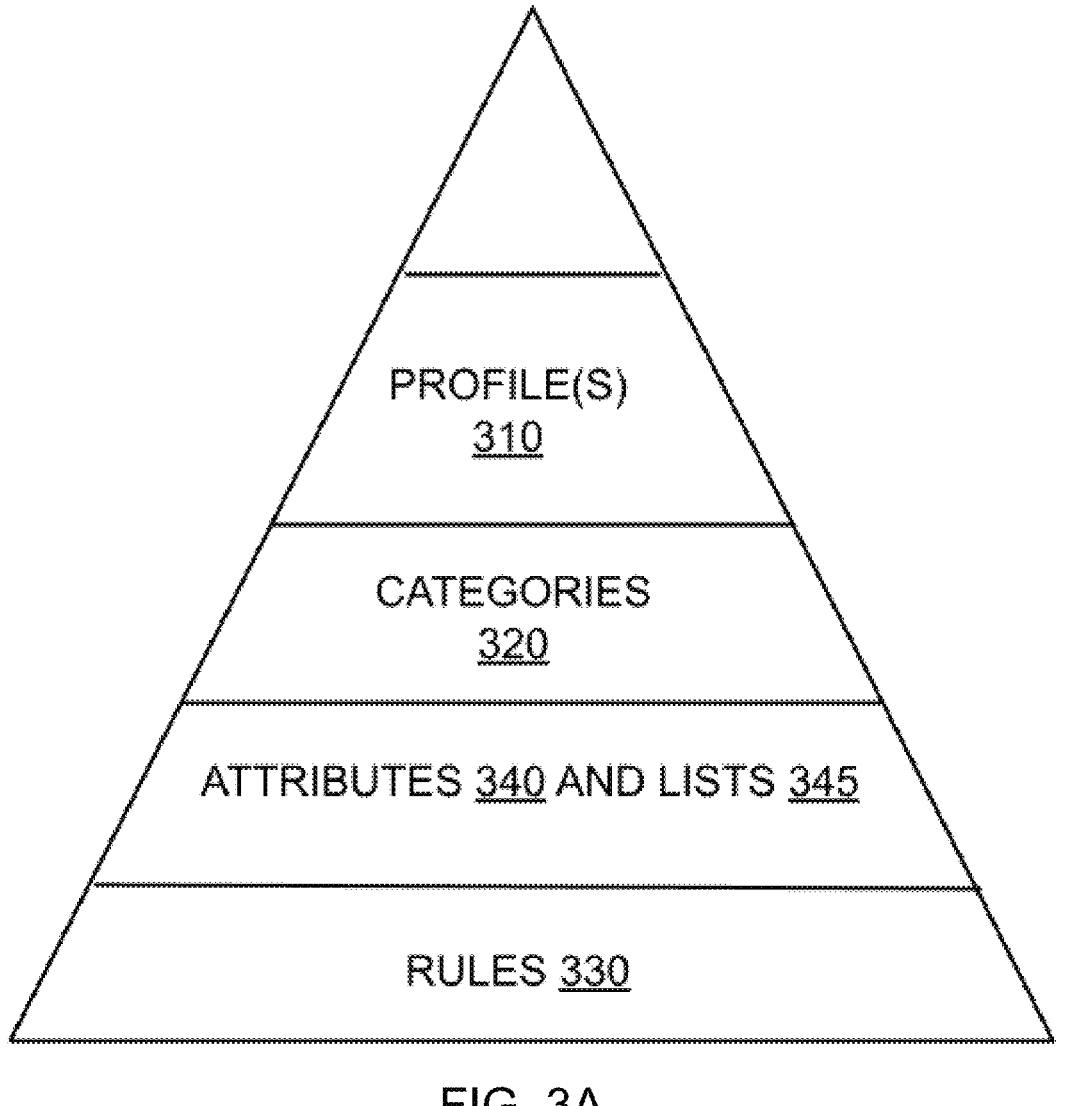
FIG. 3A is a diagram that depicts an example of a hierarchical structure for processing of transaction data records, in accordance with some implementations.

FIG. 3A is a diagram that depicts an example of a hierarchical structure for processing of transaction data records, in accordance with some implementations.

The hierarchical structure provides for profiles (310), categories (320), rules (330), attributes (340), and lists (345) that can be utilized for the efficient processing of transaction data records.

The structure is utilized for creation of rules that are utilized in processing transaction data records in a hierarchical order for the efficient determination of one or more rules from among a set of rules to be triggered based on a transaction data record.

In some implementations, the structure is utilized to create a set of rules to govern a transaction system, and/or for the subsequent processing of transaction data records.

Profiles provide a first focal point to credit each incoming transaction for subsequent categorization, prioritization, and selection of rules. Profiles (tags) are based on source transaction data type, transaction source etc. and are associated with one or more attributes in the transaction.

Categories are utilized to provide governance to group and prioritize rules based on attributes used in setting the rules. Categories are also utilized to resolve conflicts between rules by classifying rules into categories based on prioritization of the rules.

Attributes and Lists provide flexibility to design rules based on attributes available in a transaction data record. Lists (of attribute values) are utilized to provide additional governance and for the avoidance of human errors during rule creation. Attributes may include primary rule attributes that are part of the transaction data record and secondary rule attributes that are derived from the primary rule attributes and a reference hierarchy. Exception handling is provided for by utilizing custom rule attributes and custom categories.

In some implementations, lists (of attribute values) may be updated based on data from a different source, e.g. different subsystem, at a predetermined frequency. This enables specification of multiple attribute values with a simple reference to the list and rules can be dynamically adjusted without explicitly changing the rule definition.

Attributes (340) can include data values, and specific parameters that are of interest in the processing of a transaction data record. They can include identifiers associated with a product or service, identifiers associated with products and/or product type, transaction types, identifiers associated with employees participating in the transactions, identifiers associated with customers, etc. The attributes can be numeric values, strings, alphanumeric values, etc.

In some implementations, attributes and corresponding attribute values are stored based on a knowledge representation framework that includes a computational representation of a table—e.g. with columns designating attributes and rows designating data records. Attributes are also referred to properties, features, characteristics, fields, headers or independent variables, etc., depending on the use case and context. Data records may also be referred to as entities, instances, exemplars, elements, variables, etc. Each table cell therefore designates the attribute value (state) of a particular attribute of a particular data record.

In this disclosure, references are made both to attribute and attribute values, and sometimes interchangeably. In some implementations, utilization of pointers and other techniques may enable a rule to reference an attribute value without a direct reference to the attribute.

The attributes can include primary attributes and secondary attributes. During processing, additional attributes can be captured and populated. Custom attributes can be created by users based on their specific requirements and special cases.

In some implementations, lists of attributes are created from multiple transaction records, and a user interface is provided that enables a user to make a selection of attributes for a particular rule, category, profile, etc.

FIG. 3B depicts an example of profiles, categories, and attributes utilized in hierarchical processing of transaction data records, in accordance with some implementations.

FIG. 3B depicts example profiles 350, Profile A 350*a* and Profile A 350*b* that are defined for a particular use case. Users will appreciate that any number of profiles can be defined, subject to the requirements of the use case. Each profile can be characterized by specific attribute values of a particular transaction matching predetermined attribute values for one or more attributes defined for the profile.

For example, in a sales transaction processing system, different profiles may be assigned to a transaction data record based on a source of the transaction data record, e.g. whether it originated via an ERP subsystem, a POS subsystem, a CRM subsystem, etc. In some implementations, a single source transaction attribute in the transaction data record may be utilized to determine a profile to be assigned to the transaction data record. In some implementations multiple source transaction attributes in the transaction data record may be utilized to determine a profile to be assigned to the transaction data record.

In another example, in a content publishing system, different profiles may be assigned to an access data record based on whether the user request originated in a software application (App), website, desktop, mobile device, etc. In some implementations, a single attribute may be utilized to determine a profile. In some other implementations, two or more attributes may be utilized to determine a profile.

Each of the profiles 350 includes a set of categories associated with the profile. Each category of the set of categories is also associated with a specified subset of (category) attributes. The specified subset of category attributes is a subset of an overall set of attributes associated with a transaction data record and has a specified category priority.

For example, Profile A 350*a* includes Category 1 360*a*, Category 2 360*b*, and Category N 360*c*. In this illustrative example, Category 1 360*a* has a priority P1 and includes attributes Attribute-1 (i), Attribute-1 (ii), and so on, continuing on to Attribute-1 (n). The subset can include any number of attributes as long as they are part of a transaction data record.

Similarly, Category 2 360*b* has a priority P2 and includes attributes Attribute-2 (i), Attribute-2 (ii), and so on, continuing on to Attribute-2 (n).

A category can be included in one or more profiles, and may be assigned a different priority number within each of the profiles that it is included in. Attributes can be shared between categories. For example, Attribute-2 (ii) can be, (but need not be) the same as Attribute-1 (i).

FIG. 3B also depicts Profile B 350*b* that includes Category 3 360*d* with a priority P1 and Category 4 360*e* with a Priority P2.

Priority values P1, P2 can be specified in an order of rank from 1 to N, or as an absolute value within a predefined scale—for example, between 1 and 100, 0 and 1, and so on.

In some implementations, priority values for categories are specified only relative to one another within each profile. For example, a category in each profile may have a rank, i.e., the highest priority category within each category has a rank value of 1. In some implementations, priority values are specified such that they are unique across all categories. For example, in some implementations, only a single category among categories across all profiles may have a priority value of 1.

In some implementations, priority values are unique and strictly ordered, e.g. no two categories can share the same priority level. In some implementations, an upper limit may be specified for a number of attributes that can be included in a category.

Figure 3C:
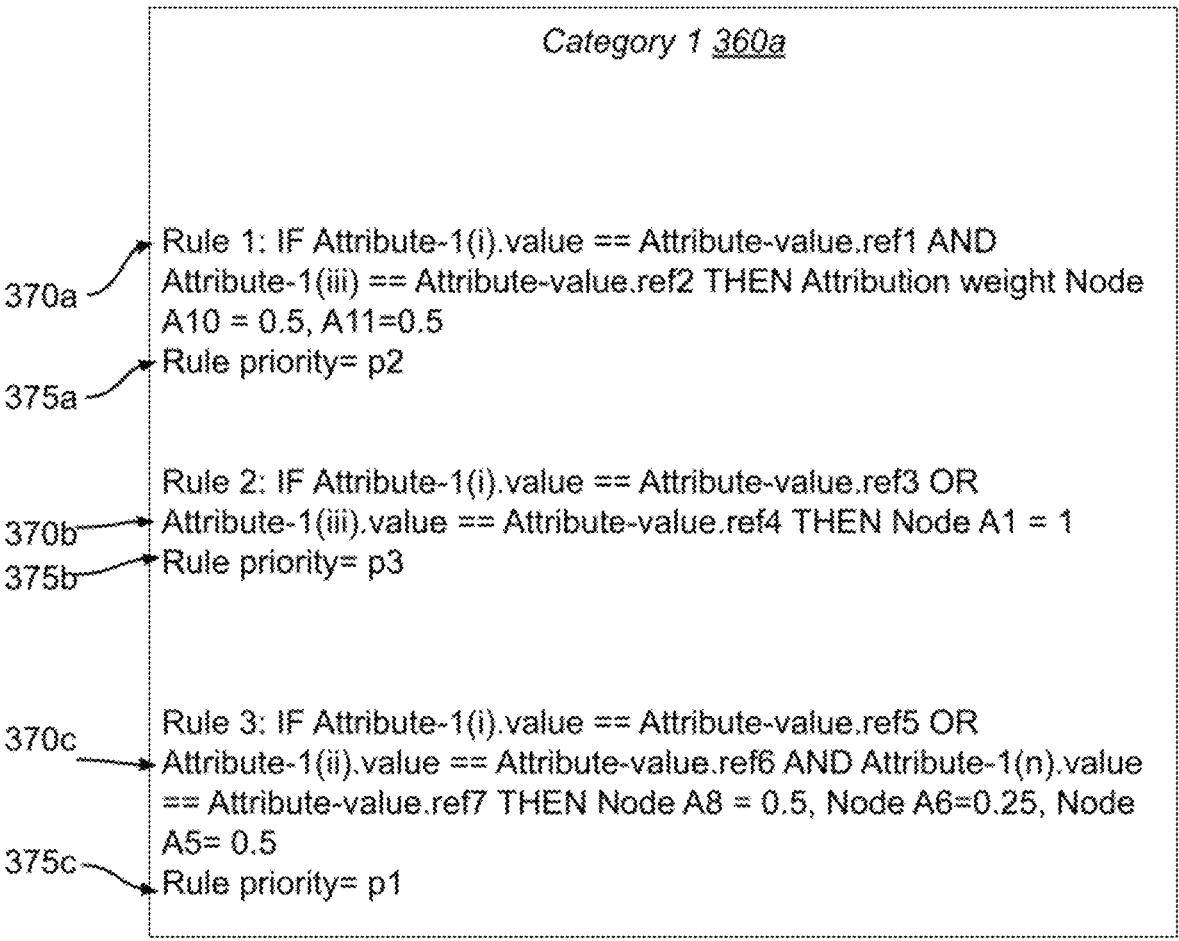
FIG. 3C depicts example rules expressed as a function of attributes, in accordance with some implementations.

FIG. 3C depicts example rules expressed as a function of attributes, in accordance with some implementations.

Each category, as described earlier, includes a set of rules that govern attribution weights for transactions that fall in that particular category, which are specified by utilizing logical expressions as a function of attributes. Each rule operates on the attributes in an IF THEN structure (or a WHEN based structure), and a match of a set of attribute values of a particular transaction data record with specified (predetermined) attribute values, triggers the rule that governs an assignment of attribution weights for one or more nodes.

The attribution weights may be specified for one or more agent nodes. In some implementations, the attribution weights may additionally be specified for one or more territory nodes. In some implementations, the territory nodes are separately determined based on one or more territory nodes that are associated with one or more agent nodes specified in a rule.

In some implementations, one or more overlay (indirect attribution) nodes may also be specified in the rule for the provision of attribution credit.

In some implementations, for better rule governance, rules associated with a category only operate on attributes specified for the category per the hierarchical order described earlier. By extension, any constructed rules can only operate on attributes that are included in the profile it is part of.

In this illustrative example, Rule 1 370*a* specifies that Node A10 and Node A11 should be assigned an attribution weight of 0.5 (or 50% attribution weight or credit) each based on a match of values of Attribute-1(i) and Attribute-1(iii) to specified (reference or target) attribute values per the logical expression associated with the rule. The rule is also assigned a priority p2 375*a*.

Rule 2 370*b* specifies that Node A1 should be assigned an attribution weight of 1 based on a match of values of Attribute-1(i) or Attribute-1(iii) to specified (reference or target) attribute values per the logical expression associated with the rule. The rule is also assigned a priority p3 375*b*.

Rule 3 370*c* specifies that Node A8 should be assigned an attribution weight of 0.5, Node A6 an attribution weight of 0.25, and Node A5 an attribution weight of 0.5, based on a match of values of Attribute-1(i) or Attribute-1(ii) and Attribute-1(n) to specified (reference or target) attribute values per the logical expression associated with the rule. The rule is also assigned a priority p1 375*c*.

As depicted in FIG. 3C, rules can be constructed using logical expressions such as AND, OR, NOT, etc. Target attribute values can be specified as a single value, or can also be specified as a set of values, where a match with any specified value is considered a match.

In some implementations, attribution weights are constrained such that a total attribution weight assigned by a rule is normalized to 1 (or 100%). In some other implementations, attribution weights are not normalized, and a total attribution weight assigned by a rule may exceed 100% (or 1).

In some implementations, the rules are associated with a start data and/or an end date to enable time based rules and to establish validity periods for rules. For example, a restructuring of a business unit or sales organization may necessitate a different rule before and after a date of the restructuring of the business unit or sales organization.

In some implementations, tools may be provided to users that can be utilized to determine invalid rules, conflicting rules, duplicate rules, etc. at a time of creation of a new rule by a user. For example, a tool may highlight newly created rules in a color indicative of a determination made regarding a rule, e.g. marking a valid rule in green, an invalid rule in red, etc. In some implementations, a trained machine learning (ML) model may be utilized to flag rules for invalidity and conflicts at creation time.

In some implementations, a determination may be made regarding attributes included in lists that are not utilized in any rule, or used in rules in a limited manner, e.g. below a predetermined number of rules that utilize a particular attribute. Such attributes may be highlighted to a user via a suitable user interface to enable the user to modify the rules base, prune data storage, data flow, and enable a more efficient system.

FIG. 4A depicts an example hierarchical structure (table) 400 for transaction data records, in accordance with some implementations.

As depicted in FIG. 4A, the hierarchical structure includes a set of example profiles (410), "SFDC," "ERP," "Subscription," "POS," "Acq" (for "Acquisition"), "Invoice," etc. The profiles are based on a source of a transaction record. For example, an 'ERP" profile may be utilized to identify transactions that originate in an ERP subsystem, e.g. as described with reference to FIG. 1B.

The hierarchical structure additionally includes categories (420), where they are utilized to further categorize a transaction type for improved rule governance. Categories are associated with specific attributes (430), and only attributes defined for a category may be utilized in construction of rules for the category.

For example, a "Deal" category includes only a single "Deal ID" attribute, while a "geo Based" category includes "BU ID," "BU Geo ID," "Country," and "Region" as attributes.

Some categories may be associated with one or more profiles (e.g. "Deal" category is associated with both an "SFDC" profile and an "ERP" profile), while some categories may only be associated with a single profile, e.g. a 'Federal' category is only associated with the "ERP" profile in this illustrative example.

Each category is associated with a profile specific category priority (440), which is used to determine a priority of the category within a profile. When categories are associated with more than one profile, they may have a different category priority within each of the multiple profiles it is associated with. In this illustrative example, a "Managed Service" category is assigned a priority of P5 in an "ERP" profile while it is assigned a priority of P4 in a "Subscription" category. In another example, a "Sales Motion" category is associated with a "SFDC" profile and a "Subscription" profile and has the same category profile (P3) in both profiles.

Figure 4B:
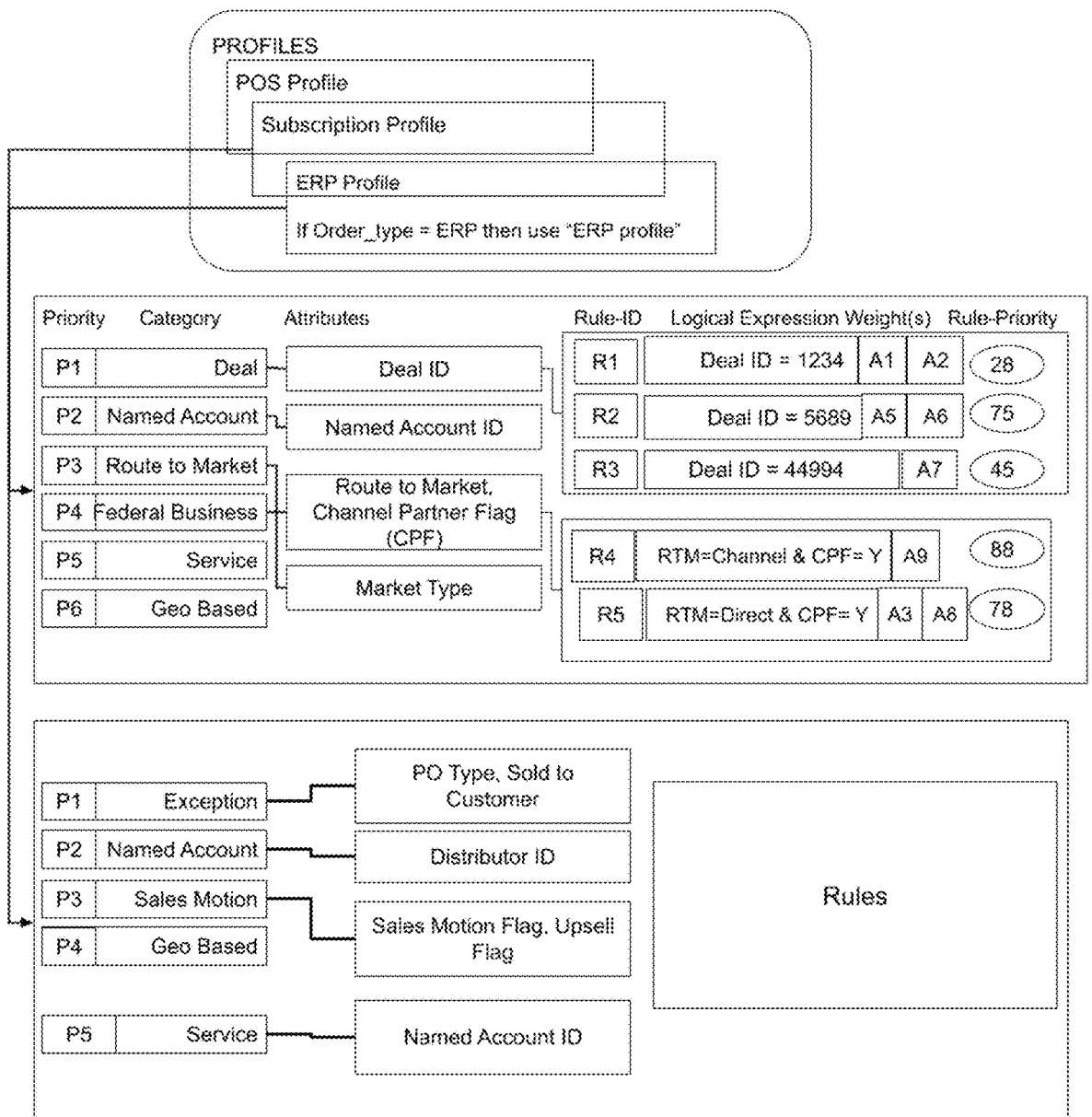
FIG. 4B depicts example use of a hierarchical structure for rule construction, in accordance with some implementations.

FIG. 4B depicts example use of a hierarchical structure for rule construction, in accordance with some implementations.

Rules are utilized for assignment of attribution weights to one or more nodes. For example, in the context of the organization described with reference to FIG. 1B, rules may be utilized to assign attribution weights (transaction or sales credit) to one or more sales agents associated with a transaction. The one or more sales agents may be represented within a computer database as nodes within a hierarchy, e.g. a sales organization chart.

In some implementations, logical expressions are utilized to express the rules for utilization in a rules engine, where a rule from a set of defined rules is triggered to determine an attribution weight to be assigned.

In this illustrative example, three profiles are depicted ("POS," "Subscription," and "ERP"). Categories associated with the "ERP" and "Subscription" profiles are also depicted. A priority associated with each category within a respective profile is depicted (P1, P2, P3, etc.). As described earlier with reference to FIG. 4A, each category is associated with a subset of available attributes that are defined for the category, e.g. by an administrator during setup.

For example, the "Deal" category utilizes only a "Deal ID" attribute, and the "Route to Market" category utilizes "Route to Market" and "Channel Partner Flag" as attributes.

Rules associated with example categories "Deal" and "Route to Market" are depicted to better illustrate techniques of this disclosure. Each Rule is associated with a Rule ID, a rule priority, and includes a logical expression to be evaluated. The rule also specifies an action upon successful triggering of the rule, which is an assignment of attribution weight based on an identification of one or more nodes and a corresponding attribution weight that is specified in the rule. The rule priority is utilized to select a rule when more than one rule within the category is determined to match the transaction data record based on a match of the corresponding attributes between the rule and the transaction data record.

As an example, within the "Deal" category," three rules R1, R2, and R3 are defined. Rule R1 is utilized to evaluate whether the 'Deal ID" attribute matches the attribute value "1234" for a given transaction data record. Upon a match, nodes A1 and A2 are identified as the agent nodes to be assigned attribution weights for that transaction, and the rule also specifies the corresponding weights (not depicted) to be assigned.

Similarly, Rule R2 is utilized to evaluate whether the 'Deal ID" attribute matches the attribute value "5689" for a given transaction data record. Upon a match, nodes A5 and A6 are identified as the agent nodes to be assigned attribution weights for that transaction, and the rule also specifies the corresponding weights (not depicted) to be assigned.

Rule R3 is utilized to evaluate whether the 'Deal ID" attribute matches the attribute value "44994" for a given transaction data record. Upon a match, node A7 is identified as the agent node to be assigned attribution weights for that transaction, and the rule also specifies the corresponding weight (not depicted) to be assigned.

Figure 5A:
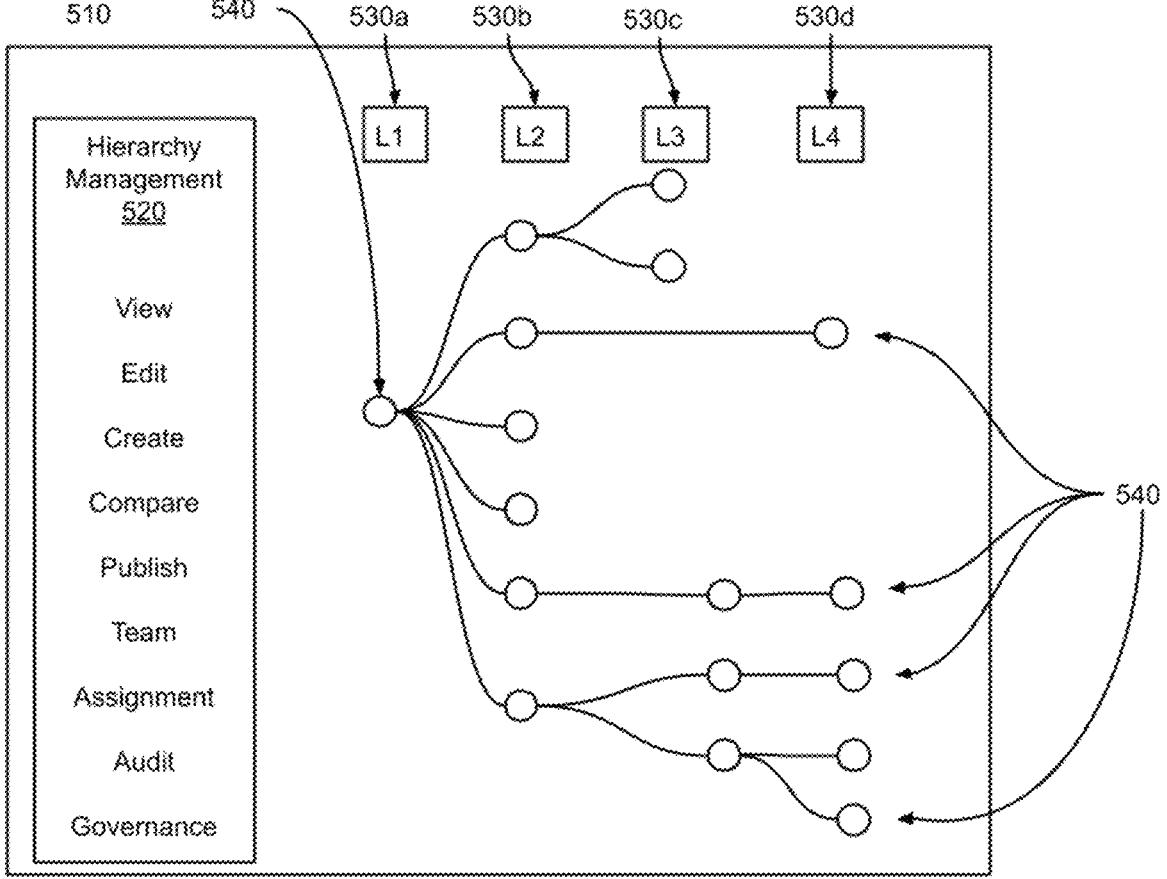
FIG. 5A illustrates an example hierarchy table, in accordance with some implementations.

FIG. 5A illustrates an example hierarchy table, in accordance with some implementations.

A hierarchy table may be utilized to represent a structured data set. The data set may be stored in any data structure(s) or stored object(s) that retain the hierarchical information about the stored values of the data set(s). Different data values are often represented as nodes that are positioned at different levels in the hierarchy. The nodes may be connected by edges and/or links to one or more other nodes in a graph.

In one example, different nodes may be stored as different rows in a table, and these different rows may each be associated with hierarchical information such as a hierarchical key that indicates the position of the row within the hierarchy.

Hierarchy tables can be used for territory hierarchy, product hierarchy, sales organization hierarchy, etc. Separate hierarchy tables may be utilized for direct and indirect (overlay) nodes. Multiple independent hierarchies can be utilized within an organization, which can be connected at one or more nodes. For example, a sales agent hierarchy node may be connected to a product node based on a particular sales agent being associated with a particular product.

As depicted in FIG. 5A, a tool is provided that enables users to create, edit, update the hierarchy table.

Hierarchy tables can be utilized to generate forecasts, measure past performance of sales agents, analyze the effectiveness of an organization, etc. For example, a sales forecast for an organization may be computed by determining a salesperson's revenue number from opportunity data associated with an agent node, that is then aggregated up across an agent node hierarchy, layer by layer as a rollup. A business unit's product shipment numbers for a previous time period may be determined by determining product shipment numbers for a product node, which can then be aggregated up across a product node hierarchy, layer by layer as a rollup, up to the level of a business unit. In another example, revenue numbers for a sales person may be determined over one or more dimensions such as: a period of time, a product, a region, etc.

In some implementations, a node in a first hierarchy may also be included as a node in a second hierarchy.

A set of territory nodes may be analyzed to provide a determination of the fairness of one or more territory nodes. The determined nodes may be visualized within a map framework. Optimization of one or more territory nodes may be suggested based on applying machine learned models to the set of territory nodes. The machine learned model(s) may be provided with feature vectors that are associated with prior booking, a pipeline of sales, Company Revenue, Capital and Funding available, Account Segment, Industry Vertical, Headcount, seasonality, and a distance between one or more territory nodes.

Figure 5B:
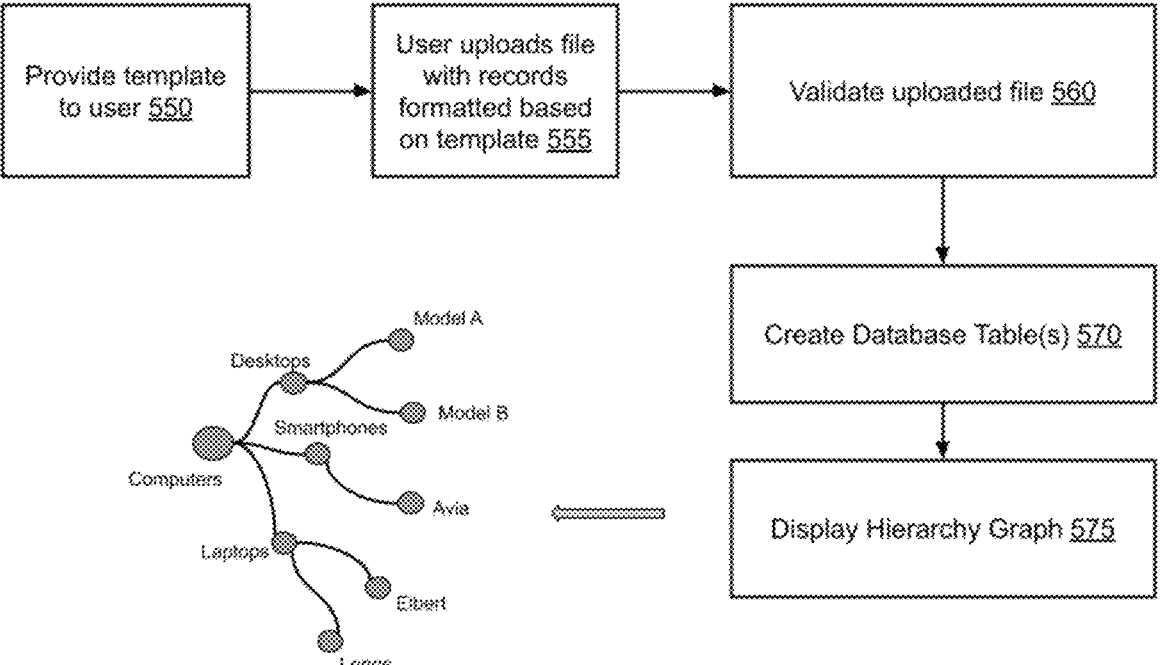
FIG. 5B illustrates an example workflow to set up a database table representative of a hierarchy, in accordance with some implementations.

FIG. 5B illustrates an example workflow to set up a database table representative of a hierarchy, in accordance with some implementations.

As depicted in FIG. 5B, a user may be enabled to set up a new hierarchy based on an upload of a file, e.g., a comma separated value (CSV) file, other text file, etc. This can provide technical advantages over other methods of creating a new hierarchy, e.g., directly entering the records into a database, which can be very time-consuming, or use specialized resources wherein scripts are utilized to load records into a database.

In some implementations, a user interface (UI) may be utilized that is designed for the configuration of custom attributes and their hierarchical organization as specified by users. This configuration facilitates the automated generation of a CSV template, downloadable by users for the purpose of entering hierarchy-related data.

Upon the submission of a filled-in template, an application executes a series of validations to ensure data integrity:
1. The initial record is designated as the Root node, mandating the absence of a Parent Node name.
2. Each Node Name must be unique within the file.
3. The fields for "Node Name" and "Parent Node Name" cannot hold identical values within any single record.
4. Fields for "Node Name," "Parent Node Name" (with the exception of the initial record), "Effective Date," and "Created By" are required to contain data.
5. If provided, the Expiration Date must exceed the Effective Date.

Successful validation advances the user to a confirmation screen, displaying the fields ready for database integration. Conversely, failed validations are presented as a list of errors, referenced by the Row Number of the file. Absence of errors enables a "SAVE" option, initiating the data's storage into a temporary database table. This action also triggers the creation of the hierarchy's initial database version and places a load process into a messaging queue.

A dedicated Worker Process retrieves and executes the load process, transferring data from the temporary table to a primary database structure. This procedure involves:

Identifying the initial record with no Parent Node name as the LEVEL 1 Root Node, assigning a unique identifier (Node Id), and inserting this information into the core database.

Sequentially loading subsequent nodes that reference the Root Node as their parent (LEVEL 2 Nodes) into the database, assigning Node Ids and correlating them with their Parent Node Id.

Recursively repeating this process from Level 1 to the most subordinate level.

Upon completion of the data load, users receive a notification of success, accompanied by options to VIEW or EDIT the uploaded hierarchy, or to initiate the upload of a new hierarchy.

A template may be provided (550) to a user.

A user may then upload (555) a file with data records formatted based on the provided template.

The uploaded file may be validated (560). Subsequent to the validation, a database table may be created (570). A hierarchy graph corresponding to the database table may be displayed.

Figure 5C:
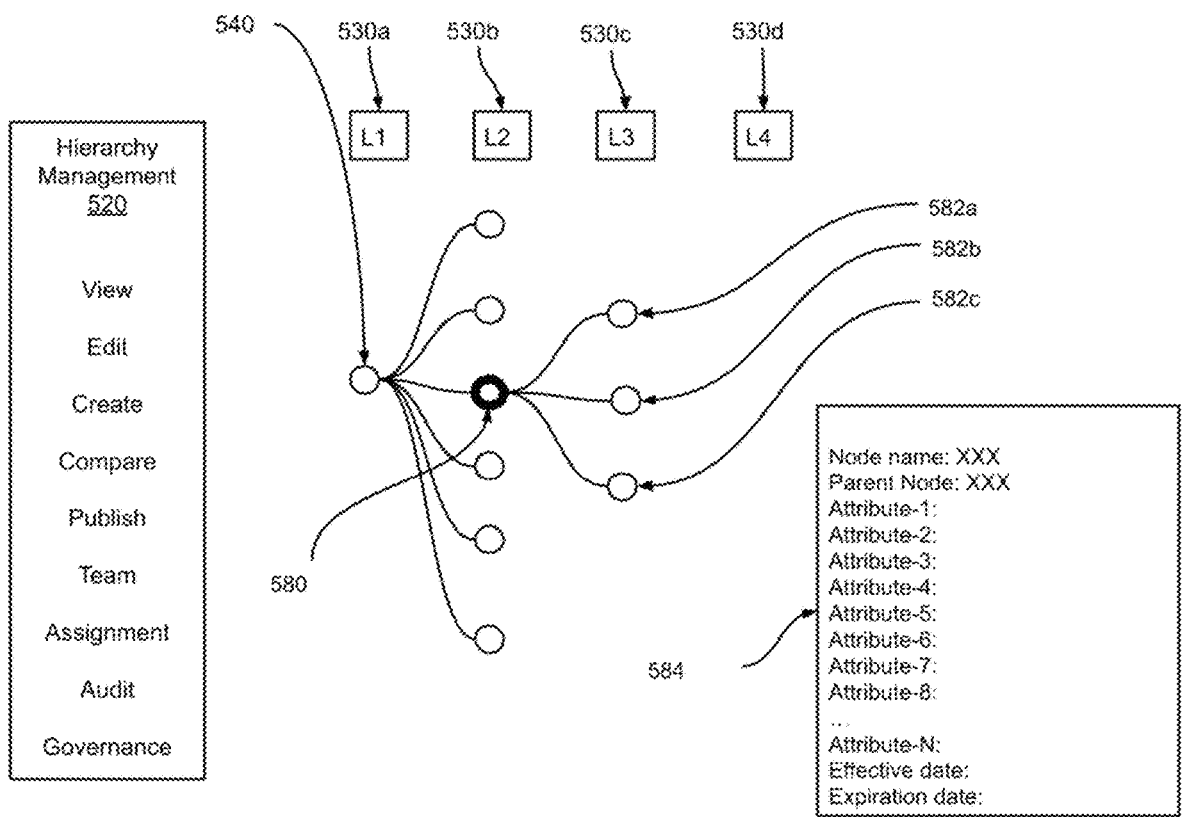
FIG. 5C illustrates an example of a memory optimized loading of a hierarchy graph, in accordance with some implementations.

FIG. 5C illustrates an example of a memory optimized loading of a hierarchy graph, in accordance with some implementations.

With hierarchies that run into thousands and tens of thousands of nodes, and where each node in a hierarchy may have multiple attributes, loading of nodes into memory, e.g., a memory of a browser, can present computational challenges.

Accordingly, per techniques disclosed herein, a set of attributes associated with a node may be partitioned into a first set of first attributes and a second set of second attributes.

The set of first attributes can include a limited set of attributes sufficient to generate and present (e.g., display on a device) a hierarchy graph whereas the set of second attributes includes the remainder of the attributes, e.g., attributes that are utilized in performing operations that involve the nodes.

When a hierarchy graph is loaded, e.g., based on a request received from a user, in some implementations, only a predetermined number of levels of the nodes in the hierarchy are loaded into memory and displayed. This enables a limit to be placed on utilization of memory on the browser, and a client device utilized by the user to load and view the hierarchy graph. Additionally, only the set of first attributes may be loaded into memory for each of the nodes.

In some implementations, the predetermined number of levels of the nodes that are to be loaded may be configurable by a user. In some implementations, the predetermined number of levels of the nodes that are to be loaded into memory may be determined based on a size of a hierarchy and a total number of nodes that can be loaded. For example, in some implementations, for hierarchies with a relatively small number of total nodes, all levels of the hierarchy may be loaded. In some implementations, an upper bound of nodes that can be loaded may be utilized to determine a number of levels of nodes. For example, in some implementations, about 5000 nodes may be specified as the upper bound of nodes that can be loaded into a memory of the browser.

When a selection of a node is detected, e.g., based on a user selection such as a click, mouse hover, voice input, etc., a next immediate lower level of nodes are loaded into memory. For example, first attributes of the next immediate lower level of nodes may be loaded into memory based on a selection of a node. Additionally, the set of second attributes for the node that is selected may also be loaded into memory to enable the user to perform edit operations on any of the attributes of the selected node.

This enables efficient use of computational resources, e.g., memory, processing power, bandwidth, etc., while also enabling a user to customize/edit the attributes of any of the nodes included in a hierarchy.

In the illustrative example depicted in FIG. 5C, at a time of loading, only nodes associated with the first two levels, L1 530a, and L2 530b are loaded into the browser memory, and displayed via a user interface.

Based on a user selection of node 580, a next immediate lower level of nodes, the L3 530c nodes, 582a-c, are loaded and displayed. However, only the first attributes of nodes 582a-c are loaded into memory. Additionally, all attributes (first attributes and second attributes) 584 of the selected node 580 are loaded into memory and displayed in a text window.

Figure 6A:
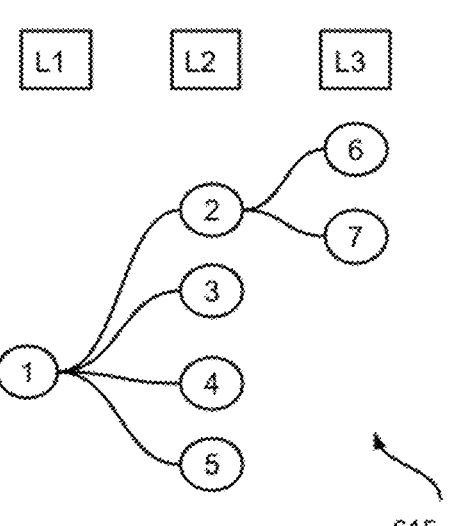
FIG. 6A illustrates an example graphical user interface for modification of nodes within a hierarchy in accordance with some implementations.

FIG. 6A illustrates an example graphical user interface for modification of nodes within a hierarchy in accordance with some implementations.

An example hierarchy table 610 is depicted that can be utilized to initialize a hierarchy, e.g. sales organization hierarchy, product hierarchy, etc. The table is converted to a tree form and displayed to the user for easy visualization as a hierarchy tree 615.

The hierarchy table and display tree include details of the different nodes within the hierarchy, e.g. node level, parent node, node description, etc.

A user is enabled to drag and drop node(s) on a user interface (UI) and make parent and child changes dynamically to underlying data structures. In some implementations, a blank table can be utilized to initialize, and all updates can be performed via the graphical user interface.

A tool may be provided to users to create and modify hierarchies. In some implementations, the tool enables users to modify and/or visualize multiple hierarchies. The tool may enable a user to add an Employee (Agent) to a node (Territory). The tool also enables unified management and view of direct and overlay territories as well as of agents.

In some implementations, a blend of hierarchy tables may be utilized for added functionality. For example, a rule-based sales territory coverage may be configured to clarify an extent of territory coverage, or to define a sales agent's coverage. In some implementations, a geo-boundary may be defined that is supported by both an agent node and a territory node (e.g. Combination of a Geography+Account+Product+custom parameter).

In some implementations, the tool enables users to model user-specific versions of a sub-set (branch) of a hierarchy and merge the versions together once finalized.

FIG. 6B illustrates example hierarchy table modifications, in accordance with some implementations.

FIG. 6B depicts a user making changes via a graphical user interface. the graphical user interface is response to one or more user interface devices, such as a keyboard, a mouse, trackball, touch pad, touch screen, pen, etc., which can be utilized by a user for interacting with a graphical user interface (GUI) provided by the browser on a display (e.g., a monitor screen, LCD display, etc.) in conjunction with pages, forms, applications and other information provided by the processing system 130 or other systems, computing devices, or servers.

In this illustrative example, the user adds a connection (620) to node 5, and creates a new node 8 (625) at level L3 with a node descriptor ("California"). Corresponding changes are automatically made to the underlying hierarchy table and displayed to the user. A history of changes, e.g. users that performed and/or authorized the changes, mode of change, date/time of change, are recorded for audit purposes.

Figure 6C:
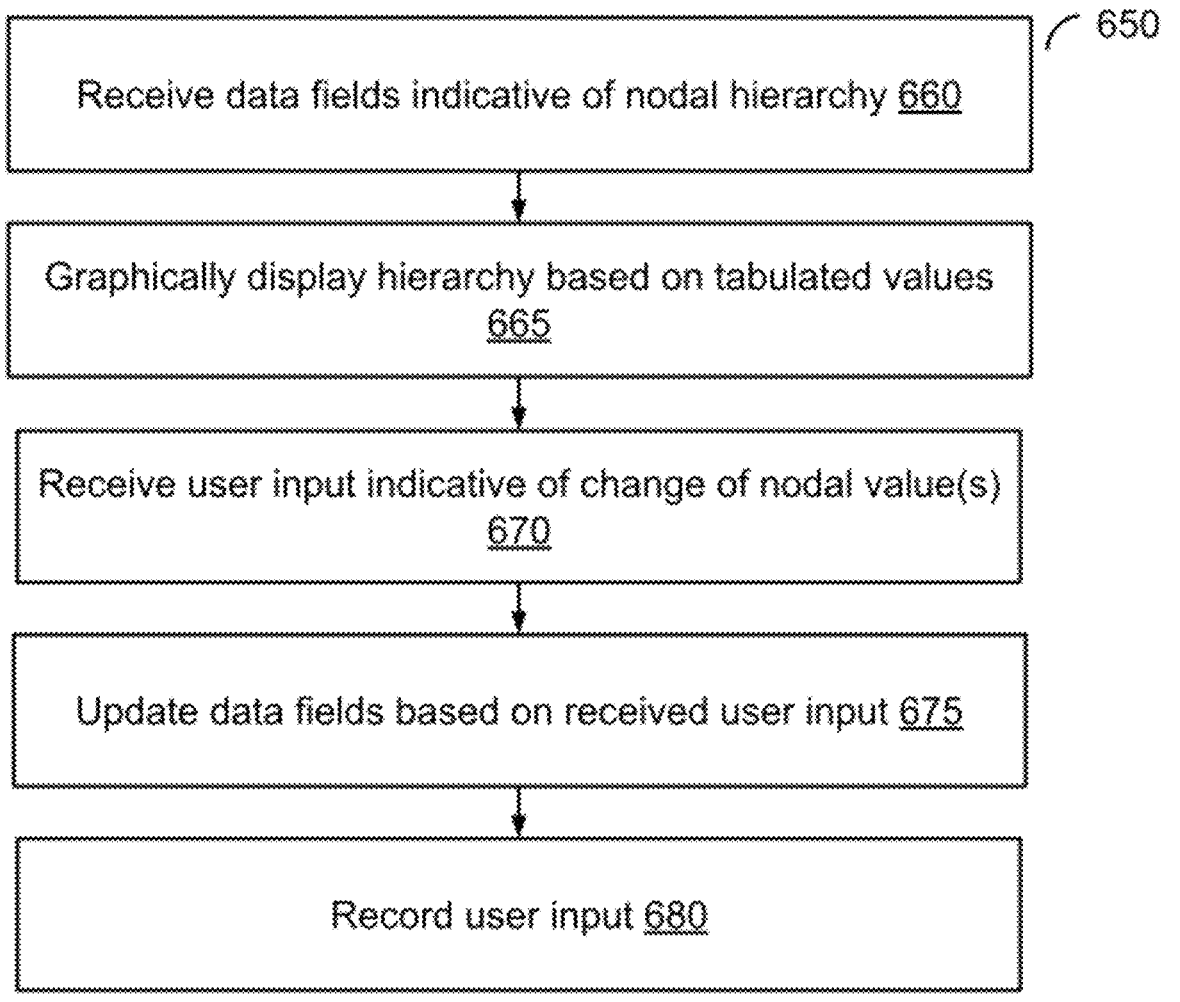
FIG. 6C is a flowchart that illustrates an example method to modify a database of nodes via a graphical user interface, in accordance with some implementations.

FIG. 6C is a flowchart illustrating an example method 650 to modify a database of nodes via a graphical user interface, in accordance with some implementations.

At block 660, data fields indicative of nodal hierarchy are received. The data fields may be received as a table of values indicative of a value for one or more nodes within the hierarchy. Processing continues to block 665.

At block 665, a hierarchy based on the data values (tabulated values) is graphically displayed. Processing continues to block 670.

At block 670, user input is received that is indicative of change of one or more nodal value(s). The user input may be received, for example, via a user interface provided to the user. Processing continues to block 675.

At block 675, the data fields are modified based on received user input. For example, one or more nodal values may be created, deleted, or edited based on the received user input. Processing continues to block 680.

At block 680, a record of all modifications is made to provide traceability and an audit history.

Figure 7A:
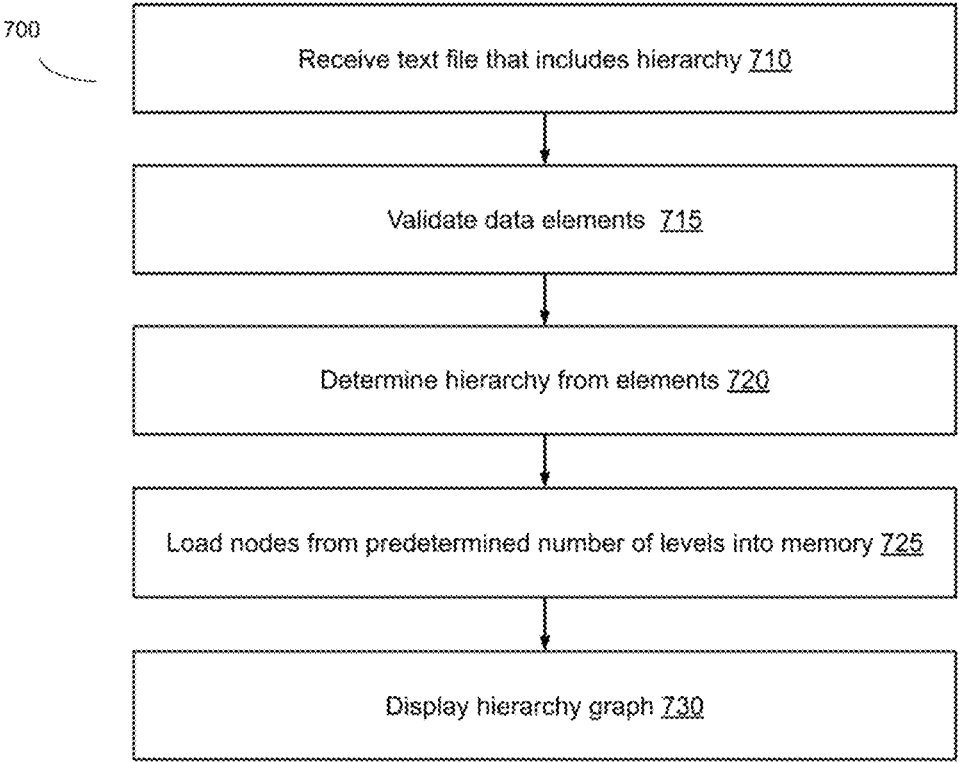
FIG. 7A is a flowchart that illustrates an example method to create a database table that represents a hierarchy, in accordance with some implementations.

FIG. 7A is a flowchart that illustrates an example method to create a database table that represents a hierarchy, in accordance with some implementations.

In some implementations, method 700 can be implemented, for example, on processing system 130 described with reference to FIG. 1. In some implementations, some or all of the method 700 can be implemented on one or more user systems 110 as shown in FIG. 1, on and/or on a combination of user systems and processing systems. In the described examples, the implementing system includes one or more digital processors or processing circuitry ("processors"), and one or more storage devices (e.g., databases 145, 150, or other storage). In some implementations, different components of one or more servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

Method 700 may begin at block 710. At block 710, a file may be received that includes data objects associated with a hierarchy. In some implementations, a file, e.g., a CSV or text file, may be received at a processor, that includes a plurality of records associated with a hierarchy, wherein each record comprises an enumeration (a list) of first attributes and second attributes.

Block 710 may be followed by block 715.

At block 715, the data objects (data elements) in the file are validated. Each of the records is validated based on particular rules that are specified.

Block 715 may be followed by block 720.

At block 720, a hierarchy (hierarchy graph) may be determined based on the data objects (data elements) included in the file. A database table or other data structure is generated based on the plurality of records and a hierarchy graph is determined based on the database table.

Block 720 may be followed by block 725.

At block 725, data objects from nodes associated with a predetermined number of levels are loaded into memory, e.g., memory of a browser. For example, nodes associated with a predetermined number of levels of the hierarchy may be loaded into memory, e.g., of a client device browser.

Block 725 may be followed by block 730.

At block 730, a hierarchy graph is displayed, e.g., via a user interface of a user computing device. displaying the hierarchy graph that includes the nodes associated with the predetermined number of levels.

Figure 7B:
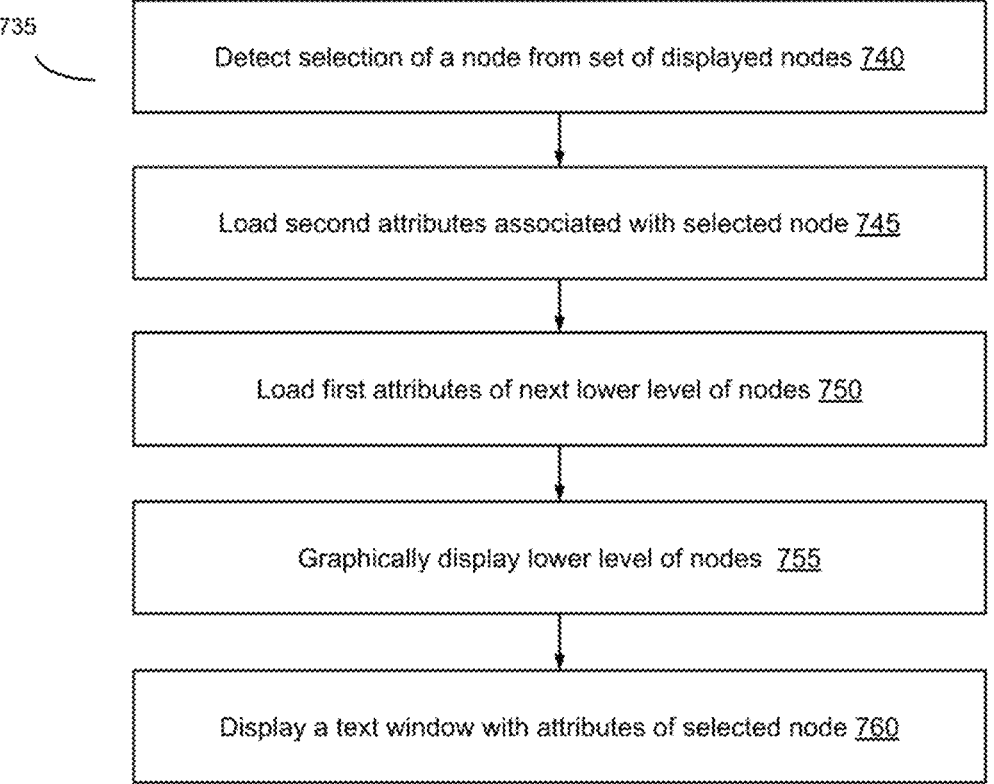
FIG. 7B is a flowchart that illustrates an example method to perform memory efficient loading of hierarchy graphs, in accordance with some implementations.

FIG. 7B is a flowchart that illustrates an example method to perform memory efficient loading of hierarchy graphs, in accordance with some implementations.

In some implementations, method 740 can be implemented, for example, on processing system 130 described with reference to FIG. 1. In some implementations, some or all of the method 740 can be implemented on one or more user systems 110 as shown in FIG. 1, on and/or on a combination of user systems and processing systems. In the described examples, the implementing system includes one or more digital processors or processing circuitry ("processors"), and one or more storage devices (e.g., databases 145, 150, or other storage). In some implementations, different components of one or more servers and/or clients can perform different blocks or other parts of the method 740. In some examples, a first device is described as performing blocks of method 740. Some implementations can have one or more blocks of method 740 performed by one or more other devices (e.g., other client devices or server devices) that can send results or data to the first device.

Memory efficient loading may be performed to mitigate issues encountered when dealing with large hierarchies, as the client side browser can crash, unable to handle large amounts of data being sent from the server, e.g., a cloud based server that hosts the hierarchy data and/or tables.

In some implementations, per techniques of this disclosure, lazy loading techniques may be implemented to regulate the data volume, and prevent large volumes of data coming into client browsers.

1. Limit initial load and load only required data to display hierarchy, e.g., the attributes in the record that are sufficient to display a hierarchy graph.
2. On-demand loading—Load details only on user action.
3. Infinite scroll—This method is used to display tabular data, to load initial data and subsequent data is loaded as the user is scrolling down.

Only 2 levels of nodes in the hierarchy are loaded first.

Every hierarchy will have a single root node at level 1 and most hierarchies will have very few nodes at level 2.

Other nodes at lower levels are loaded only on click (explicit action) to expand that particular node.

The idea is that commonly users will like to view and manage a small portion of the hierarchy at a time. So let users navigate to that portion of the hierarchy instead of loading the complete hierarchy.

Fetching only structure information (Node identifier (Id), Node Name, Parent Id, Level) during initial load, to display the hierarchy.

There are 2 steps in hierarchy management, managing hierarchy itself and managing each node in the hierarchy. The initial load will help in managing hierarchy alone.

Detailed information of each node is pulled only through "On click" action for that node.

Following details of each node are pulled on action for node management (Node type, effective-date, expiration date, metrics, assignments, coverage status, Original names and any other custom attributes)

Details of previous nodes are unloaded when a new node is selected, e.g., based on a click.

Java runtime environment (e.g., a garbage collector application) then frees up the memory.

Method 740 may begin at block 745. A set of nodes may be displayed as a hierarchy graph by loading attributes of the nodes into memory. In some implementations, in order to conserve the memory, loading the nodes may include loading into memory only the first attributes of a predetermined number of levels of nodes. The predetermined number of levels may be based on the amount of memory available, type of browser, user configuration settings, etc. In some implementations, the first attributes that are loaded may include initial attributes, e.g., Level node name, parent ID and node ID. In some implementations, the remainder of the attributes are loaded only upon selection of a particular node, e.g., when a node is clicked, the additional attributes may be fetched from a database.

At block 745, a selection of a node from a set of displayed nodes is detected, e.g., detection of a user selection of a second node of the nodes included in the displayed hierarchy graph. Block 745 may be followed by block 750.

At block 750, additional attributes associated with the selected node are loaded into memory. In some implementations, the additional attributes associated with the selected second node are loaded into the memory of the browser from cloud based storage. In some implementations, loading the additional attributes associated with the selected node may be implemented by overwriting the attributes in memory of a previously clicked node with the attributes of the selected node.

In some implementations, garbage collection of data from other nodes may be performed wherein first (marker) attributes of other nodes are retained.

Block 750 may be followed by block 755.

At block 755, basic attributes of nodes at the next (immediate) lower level of nodes are loaded into memory. Block 755 may be followed by block 760.

At block 760, the next lower level of nodes are displayed. This may include displaying graphically the lower level of nodes in addition to already displayed nodes. Block 760 may be followed by block 765.

At block 765, a text window may be displayed that displays additional attributes of the selected node. For example, a text window may be separately launched and utilized to display second attributes and first attributes of the selected second node. This may enable a visualization of the complete set of node attributes, and enable a user to edit one or more of the attributes.

Figure 7C:
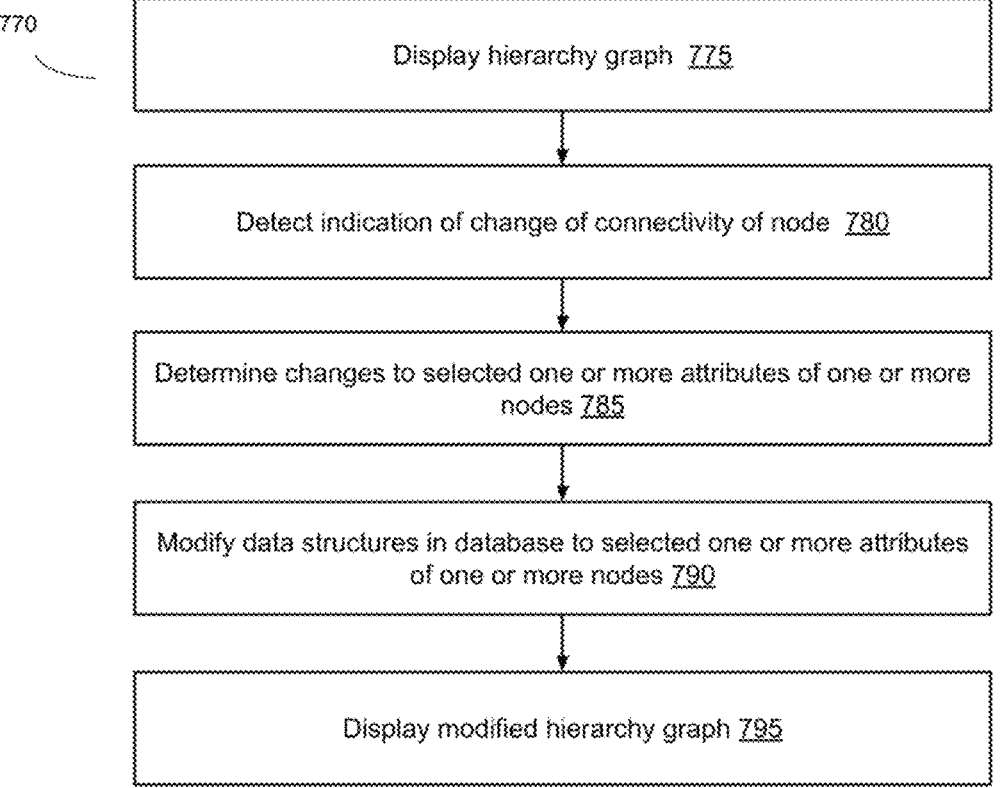
FIG. 7C is a flowchart that illustrates an example method to modify a data table based on inputs received via a graphical user interface, in accordance with some implementations.

FIG. 7C is a flowchart that illustrates an example method to modify a data table based on inputs received via a graphical user interface, in accordance with some implementations.

In some implementations, method 770 can be implemented, for example, on processing system 130 described with reference to FIG. 1. In some implementations, some or all of the method 770 can be implemented on one or more user systems 110 as shown in FIG. 1, on and/or on a combination of user systems and processing systems. In the described examples, the implementing system includes one or more digital processors or processing circuitry ("processors"), and one or more storage devices (e.g., databases 145, 150, or other storage). In some implementations, different components of one or more servers and/or clients can perform different blocks or other parts of the method 770. In some examples, a first device is described as performing blocks of method 770. Some implementations can have one or more blocks of method 770 performed by one or more other devices (e.g., other client devices or server devices) that can send results or data to the first device.

In some implementations, a capability to move a node from an existing parent to another parent at the same level or any other level higher or lower in the hierarchy may be provided. Any such movement may need changes to the following attributes.

Parent Id—This gets updated for every node that gets moved.

Node level—This gets updated only for those nodes which get moved to either higher or lower levels. Not only the nodes moved directly, but all existing children nodes at different levels under them will also get their node level updated.

In some implementations, when a node is dragged or moved to another parent and the hierarchy is saved, then an application program interface (API) is called to update the parent Id.

A check is then made if the level or depth of that node in the hierarchy has changed. If the level or depth of that node in the hierarchy has not changed, then no further action is taken. If level/depth has changed, then we capture the delta (e.g., change in level) in the depth and another API is called, that calls a database function with affected node Id and delta value as parameters.

The database function will recursively find all the children and grandchildren nodes of that moved node and adjust the node levels of all the children and grandchildren nodes.

Once all the children/grandchildren nodes are updated with new level/depth a final commit is done to save the changes in the db and UI is reloaded with updated changes.

Method 770 may begin at block 775.

At block 775, a hierarchy graph is displayed. For example, the hierarchy graph may include a plurality of nodes and may be displayed on a user interface, e.g., in a display screen, etc., a hierarchy graph that includes a plurality of nodes. In some implementations, the hierarchy graph is accessed via a browser installed on a client device.

In some implementations, each of the nodes is associated with a corresponding data structure in a database, and is associated with a set of first attributes, e.g., display//identifier attributes, and a set of second attributes, e.g., additional/detailed attributes. In some implementations, the hierarchy graph may include a display of a graphical representation of each of the nodes and textual indicia associated with each of the nodes that are selected from the set of first attributes for each displayed node.

Block 775 may be followed by block 780.

At block 780, an indication of a change to connectivity of a node is detected. In some implementations, detecting the indication of a change to connectivity of a first node of the plurality of nodes may include detecting via a user interface, a click of a mouse, voice input, drag and drop of a screen object, selection of an edge of a node, which may then be moved and snapped to another node, etc.

In some implementations, detecting the indication of the change may include detecting an indication of an addition of a new node to the hierarchy graph. For example, a modification to the node that includes addition of a new node and a corresponding edge may be received via a graphical user interface that displays a hierarchy graph associated with the hierarchy.

In some implementations, detecting the indication of the change may include detecting a change in value of a parent node for the first node. In some other implementations, detecting the indication of the change may include detecting a deletion of a node. Block 780 may be followed by block 785.

At block 785, in response to detecting the indication of the change to the connectivity of the first node, a change to the first attributes of one or more modified nodes of the plurality of nodes is determined.

If the change to the connectivity is a change of a parent node, a parent ID and/or level may be modified. Other attributes, e.g., second attributes remain unchanged.

In some implementations, a modified parent value is determined for the first node. It is further determined whether there is a change in a level associated with the first node (being modified). If it is determined that there is a change is the level associated with the first node, an amount of change (delta) is determined and a current level of the first node is accordingly adjusted (e.g., incremented or decremented by the delta. A level of all nodes at levels lower than a level of the first node is recursively adjusted by the same delta.

If the change to the connectivity is the addition of a new child node, attributes of the child node are received and recorded. If the change to the connectivity is the deletion of a node, the node is deleted from the database table.

All changes are recorded as events and suitable confirmation is obtained from the user prior to updating the database table(s) and records.

Block 785 may be followed by block 790.

At block 790, data structures in a database are modified. In some implementations, first attributes in a database that correspond to the one or more modified nodes are modified and stored. The modification of the data structure may be based on the received modification.

Block 790 may be followed by block 795.

At block 795, a modified hierarchy graph may be displayed. In some implementations, the modified hierarchy graph that includes the modification is displayed on the user interface.

Figure 8:
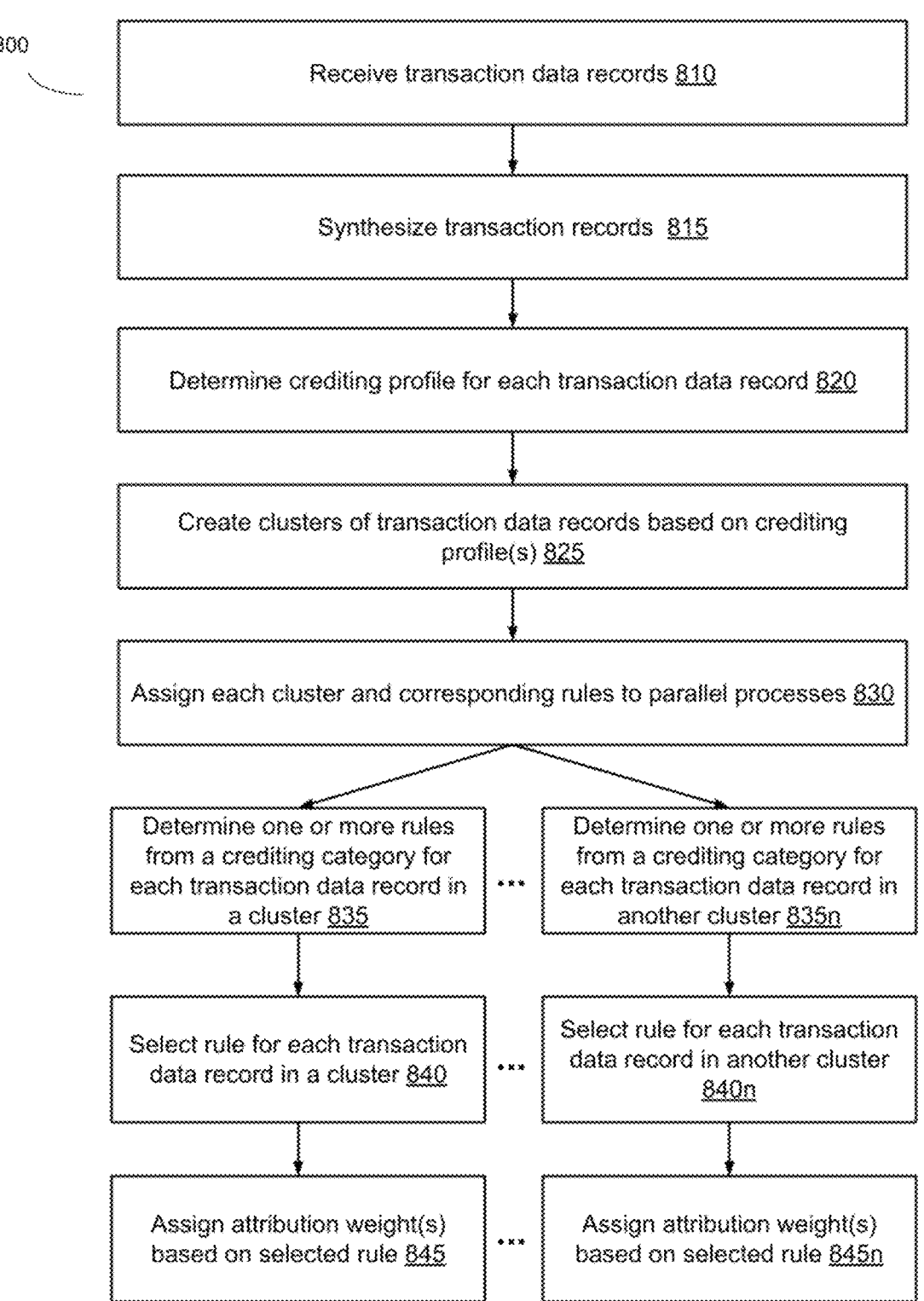
FIG. 8 is a flowchart illustrating an example method to assign attribution weights, in accordance with some implementations.

FIG. 8 is a flowchart illustrating an example method to assign attribution weights, in accordance with some implementations.

In some implementations, method 800 can be implemented, for example, on processing system 130 described with reference to FIG. 1. In some implementations, some or all of the method 800 can be implemented on one or more user systems 110 as shown in FIG. 1, on and/or on a combination of user systems and processing systems. In the described examples, the implementing system includes one or more digital processors or processing circuitry ("processors"), and one or more storage devices (e.g., databases 145, 150, or other storage). In some implementations, different components of one or more servers and/or clients can perform different blocks or other parts of the method 800. In some examples, a first device is described as performing blocks of method 800. Some implementations can have one or more blocks of method 800 performed by one or more other devices (e.g., other client devices or server devices) that can send results or data to the first device.

In some implementations, the method 800, or portions of the method, can be initiated automatically by a system. In some implementations, the implementing system is a first device. For example, the method (or portions thereof) can be periodically performed, or performed based on one or more particular events or conditions, e.g., reception of a batch of transaction data records, at a predetermined time, a predetermined time period having expired since the last performance of method 800, and/or one or more other conditions occurring which can be specified in settings read by the method.

At block 810, multiple transaction data records are received. Each transaction data record of the multiple transaction data records can include multiple attribute values corresponding to attributes associated with a transaction.

The transaction data records may be received in a variety of formats. In some implementations, the transaction data records are received via an Application Program Interface (API). In other implementations, the transaction data records may be received via batch files. The transaction data records include multiple attribute values that are associated with attributes of transactions.

In some implementations, a sequence of transaction data records is received, e.g. using an API. Suitable memory buffers may be utilized to create a batch of transaction data records from the sequence of transaction data records using a memory buffer.

In some implementations, only attribute values are received in a predetermined format that enables an automatic mapping of attribute values to their corresponding attributes. Custom formats may be utilized for the transaction data records, and can be based on a setup of configurations during initial engagement. Processing continues to block 815.

At block 815, it is determined whether transaction synthesis is to be performed for a particular transaction data record based on one or more attribute values in the particular transaction data record. For example, it may be determined that transaction synthesis is to be performed for a particular transaction data record based on a match of one or more attribute values in the transaction data record with attribute values that are indicative of a bundled transaction, multi-year transaction, etc.

If it is determined that transaction records are to be synthesized, two or more synthesized transaction data records are created, wherein each of two or more synthesized transaction data records includes a reference to the original (first) transaction data record. One or more attribute values associated with the first transaction data record are associated with the two or more synthesized transaction data records, either through use of one or more identifier attributes, or by the use of identifiers that include a reference to attributes in the original transaction data record.

FIG. 9A depicts example transaction data record synthesis, in accordance with some implementations.

As described earlier, synthesis of transaction data records is performed when it is determined that a received transaction data record includes multiple types of transactions that are to be unbundled, split into multi year records, etc. for the purposes of accurate and/or efficient assignment of attribution weights. Transaction synthesis is architecturally beneficial since typically, rules are commonly designed for different types of transactions, which sometimes can be billed and hence, recorded as a single transaction record.

For example, in the transaction data records described with reference to FIG. 2, transaction data records 210a and 210b are associated with a first transaction type ("Bundle") while transaction data records 220a and 220b are associated with a second transaction type ("Hardware").

As depicted in FIG. 9A, new transaction data records 910b, 912b, and 914b are synthesized based on the originally received transaction data record 210b. The original booking amount ("$2820") is divided into three different amounts that represent different constituent elements of the transaction. In this illustrative example, the original booking amount is divided into $900 towards hardware, $1200 towards a voice service, and $720 towards a data service, all associated with the purchase of the bundle.

In some implementations, synthesis of new (synthesized) transaction data records may be based on a time period associated with the transaction, and a number of synthesized transaction records may be based on the time period associated with the transaction. For example, in some implementations, if a booked transaction was a two year contract, and attribution weight processing was performed on a monthly basis on single transactions, twenty-four transaction data records may be synthesized, one for each month of the contract. In some implementations, the original (parent) transaction data record may be suitably modified to take transaction synthesis into account.

In some implementations, transaction synthesis may be performed outside of the loop described as part of method 800.

Processing continues to block 820.

At block 820, a crediting profile is determined for each transaction data record based on one or more attribute values in the transaction data record. Processing continues to block 925.

At block 825, a plurality of clusters of transaction data records are created, wherein each cluster of the plurality of transaction data records is associated with a corresponding crediting profile. Processing continues to block 830.

At block 830, each of the plurality of clusters of transaction data records and sets of corresponding rules are assigned to a plurality of processes. In some implementations, the processes may be implemented on a set of processors operating in parallel. In other implementations, the processes may be implemented by utilizing a set of parallel threads that execute on one or more processors. In some implementations, the processes may be executed on a set of processor cores that are utilized in one or more processes.

Rules associated with each crediting profile are loaded into memory (cache) associated with the corresponding processor (or core or thread) where the corresponding transaction data record cluster is assigned to enable localization of data and rules for each cluster.

As an example, with reference to FIG. 4B, assigning of a cluster of transaction data records that is identified as an 'ERP" profile may include assigning the identified transaction data records, attributes associated with all included crediting categories (with priorities P1 through P6), and all specified rules defined within the included crediting categories, e.g. R1 through R5 in this simplified example.

A superset of attributes (and their respective attribute values) that encompass attributes utilized in all defined rules for all categories of the profile being assigned to a cluster/process are loaded into the cache. For example, out of about 4000 attributes utilized over all transaction records across all tenants, only about 100 attributes and their corresponding values may be loaded into the cache associated with a single process utilized to select a rule.

This enables faster processing by minimizing a number of times that a firing (triggering) of a rule will necessitate fetching of data records from a memory device not local to the processor executing the rule. Processing continues to block 835.

Blocks 835 to 845 depict parallel processes being executed for multiple clusters of transaction data records. As depicted in FIG. 8, blocks 835 to 845 may be utilized to process transaction data records from a first cluster (of a first profile), while blocks 835$n$ to 845$n$ may be utilized to process in parallel transaction data records from an $n^{th}$ cluster (of another profile). It may be appreciated that a degree of parallelism may be configurable. For example, in some implementations, two sets of crediting profiles and their associated rules may be assigned to a single process.

At block 835, one or more rules from a crediting category is determined for each transaction data record of the cluster of transaction data records. The determination may be based based on a match of attribute values of a subset of attributes in the transaction data record with attribute values of the subset of attributes in a set of rules, wherein the plurality of crediting categories are associated with a predetermined priority order and the sets of rules are evaluated in the priority order of the plurality of crediting categories.

Determining a match of rules associated with each transaction data record may include determining a match of rules of crediting categories in an ordered sequence based on priority values associated with the crediting category. The set of crediting categories are associated with a predetermined priority order of categories (e.g. P1 through P6 in the example depicted in FIG. 4B) and are evaluated in the priority order. For example, if a crediting profile includes four crediting categories, each received transaction data record is evaluated relative to rules from each of the four crediting categories in decreasing order of crediting category, e.g. from the highest ranked category to the lowest ranked category.

In some implementations, additional parallelization may be provided. For example, when evaluating all rules within a crediting category relative to a set of transaction data records, the rules may be evaluated in parallel against the transaction data records. A threshold number of transactions may be utilized to determine whether the rules are evaluated against the transaction data records, or whether the transaction data records are evaluated against the rules.

For example, when a number of transaction data records meets the predetermined threshold, e.g. exceeds the predetermined threshold for number of transactions in the cluster/batch, the rules may be evaluated against the transaction data records. If the number of transaction data records does not meet the predetermined threshold, the transaction data records may be evaluated against the rules.

In some implementations, a comparison of a number of rules and a number of transaction data records is utilized to determine whether rules are to be evaluated against transaction data records, or if transaction data records are to be evaluated against rules. For example, in some implementations, if a number of transaction data records is greater than a number of rules in a rule processing batch, e.g. within the crediting category being processed, the rules are evaluated against the transaction data records. A sequence of rules are evaluated against a transaction data record to determine one or matches of a rule with the transaction data record. The evaluation is repeated for multiple transaction data records until all transaction data records from the batch are processed.

If a number of transaction data records is less than a number of rules in a rule processing batch, e.g. within the crediting category being processed, the transaction data records are evaluated against the rules. A sequence of transaction data records are evaluated against a rule to determine one or matches of transaction data records with the rule. The evaluation is repeated for multiple rules until all rules from the batch are processed.

In some implementations, the predetermined threshold for number of transactions may be based on a number of available computational processes, e.g. processors, threads, processor cores, etc.

An ordering of the matching, e.g. rules against transaction data records or vice versa, may be determined by a type of processing of the transaction data records, e.g. batch mode processing of transactions, batch and online mode processing of transactions, online mode (real time) processing of transactions. For example, rules may be evaluated against transaction data records for batch mode processing, and transaction data records may be evaluated against rules for online processing.

Hybrid approaches are also envisaged. For example, in a particular use case, a first crediting category may include a large number of transactions and a relatively smaller number of rules, and a second crediting category may include a relatively smaller number of transactions and a relatively large number of rules. In such a scenario, for a first crediting category, the rules are evaluated against transaction data records, whereas for a second crediting category, the transaction data records are evaluated against the rules.

Batch-wise parallelization of rules processing is illustrated herein in an example where four computational processes, e.g. processing threads, processors, processor cores, etc. are available for rules processing. In this illustrative example, a rules processing batch, e.g. a set of rules that are associated with a particular crediting category, is considered that includes 8 transaction data records and 4 rules that are to be evaluated. In this illustrative example, it may be advantageous to assign one or more transaction data records to each of the available processes, and evaluate the rules against the transaction data records by assigning all 4 rules to each of the processes, and each process is utilized to determine which of the rules match the respective transaction data record assigned to the process. In this example, an output of each (computational) process is an identifier associated with a rule that matches the transaction data record that it is evaluated against. For example, process 1 may provide an output that indicates that Rule 1 is a match against Transaction 1; process 2 an output that indicates that Rule 2 and Rule 3 match Transaction 2; process 3 an output that indicates that Rule 4 matches Transaction 3, and process 4 an output that indicates no match of any of the rules with Transaction 4. Parallelization of the rules processing provides efficiency in rules processing.

In contrast, in another illustrative example, another configuration is considered where there are 4 transactions and 8 rules to be evaluated. In this illustrative example, it may be advantageous to assign sets of the 8 rules (e.g. in sets of 2) to each of the available processes, and by evaluating each of the 4 transactions against the rules assigned to a respective process.

In some implementations, if there is a match of rules from a first crediting category with a transaction data record, other crediting categories are not evaluated even when there may be a match of rules from one or more other crediting categories.

In some implementations, attribute values for matching rules and transaction data records may be selected from a list of values, as described with reference to FIG. 3.

Processing proceeds to block 840.

At block 840, a rule is selected, for each transaction data record, based on rule priority values of one or more rules from a set of rules that were determined to match, for example, at block 835. The selected rule identifies at least one agent node and specifies an attribution weight for at least one agent node. The at least one agent node may be one of a plurality of agent nodes in an ordered hierarchy of agent nodes, as described earlier with reference to FIG. 5A. In some implementations, the selected rule also identifies at least one territory node.

In some implementations, the at least one agent node is associated with at least one territory node, and the at least one agent node inherits one or more properties of the at least one territory node.

In some implementations, all rules within the crediting category are evaluated, and a rule is selected based on the highest priority rule that met rule conditions based on attribute values in the rule conditions and the transaction data record. In some implementations, one or more rules associated with a set of attribute values that match the second subset of attribute values associated with the transaction record are determined and a rule with the highest priority from the one or more matched rules is selected.

In some implementations, as described earlier, the determination and selection of rules is made without an explicit determination of a crediting category. The crediting category is implicitly determined based on the one or more rules that match the attributes in the transaction record.

Processing continues to block 845.

At block 845, attribution weight(s) specified in the selected rule are assigned to the at least one agent node.

In some implementations, the subset of attributes utilized for the determination of rules is a proper subset of the set of attributes associated with a profile, and at least one attribute from the set of attributes is omitted when performing the comparison for the rule selection.

In addition to assigning attribution weights based on the triggered (selected) rule, transactional data regarding rules are also analyzed and stored for further improving the rules engine. For example, if it is determined that two or more rules matched for a particular transaction record, the two or more rules and the attribute values associated with the transaction data record are stored.

Based on triggered rules, rules from the set of rules that were never triggered most frequently allocated rules, e.g. top 100 triggered rules, etc., transaction data records that did not trigger any rule etc. are identified. Such identified rules and/or transaction data records may be highlighted to the user. In some implementations, rules whose match with transaction data records exceeded a predetermined threshold, but were never selected, e.g. due to other higher priority rules being selected, are identified and may be highlighted to the user.

In some implementations, at predetermined time intervals, one or more rules that were not selected as applicable to any transaction data record may be identified. In some implementations, one or more rules that were selected with a frequency that met a threshold frequency may be identified. In some implementations, transaction data records for which a rule was not selected may be identified. In some implementations, a subset of transactions where attribution weights were assigned to a number of agent nodes that meets a predetermined threshold number of agent nodes may be determined and highlighted to a user. In some implementations, combinations of the above referenced sets of rules may be identified.

In some implementations, a counter may be utilized for each selected rule, and an ordered set of frequently triggered/selected rules may be highlighted to a user via a user interface, e.g. GUI described with respect to FIG. 5A. For example, a list of the top 10, 20, 50, or 100 rules selected may be generated and highlighted to a user.

In some implementations, a list of rules where rule conditions match a number of transaction data records exceeding a threshold may be generated and highlighted.

In some implementations, additional analytics such as analysis of manually reallocated/adjusted/claimed transactions may be performed to recommend rule changes, prediction of revenue leakage based on an existing set of crediting rules, etc.

In some implementations, recommendations may be generated for creation of additional rules and/or the deletion of certain rules. A load on processes and/or processors may be analyzed to determine suggested changes to profiles to enable balancing of future computational processing loads. For example, it may be determined that two crediting profiles be assigned to the same cluster/process to balance future computational loads in a particular use case.

Blocks 810-845 can be performed (or repeated) in a different order than described above and/or one or more steps can be omitted. For example, in some implementations, block 815 may be omitted, and processing can proceed directly from block 810 to 820.

In some implementations, it may be determined that a particular transaction data record is also eligible for an overlay credit. At block 845, if an identified agent node is associated with an overlay, a second subset of attribute values may be evaluated to determine if the transaction qualifies for overlay credit. In some implementations, overlay nodes are mapped to identified agent nodes, and the second subset of attribute values in the transaction data records is compared to a list of attribute values that are eligible for overlays.

In a first pass of blocks 810 through 845, transactions are assessed against direct profiles and processed in parallel clusters based on the determined crediting profiles. Transactions that are eligible for overlay credit are tagged at a time of assignment of direct credit. Overlay eligible transactions are evaluated using a second pass of blocks 810 to 845, and a cluster of transaction records created for a second (or subsequent) processing for the assignment of overlay credit.

Figure 9B:
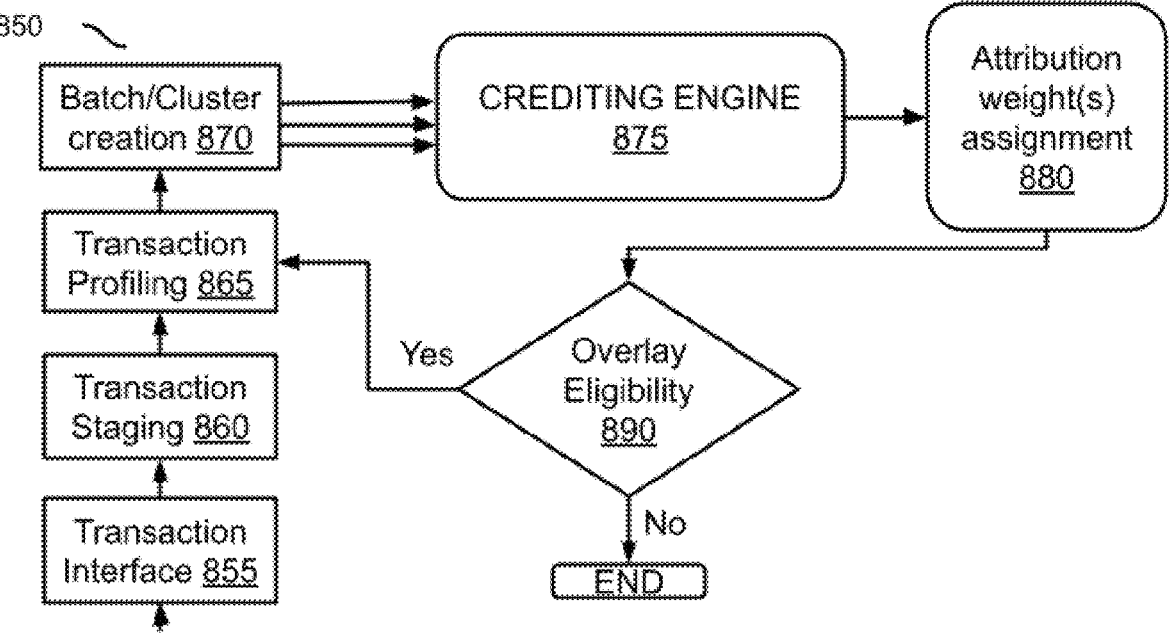
FIG. 9B is a block diagram illustrating an example overlay attribution credit, in accordance with some implementations.

FIG. 9B is a block diagram illustrating an example overlay attribution credit, in accordance with some implementations.

A transaction interface (855) is utilized to receive transaction data records, e.g. from a data store, or from another subsystem. A transaction stage (860) is utilized to perform staging. A transaction profiling module (865) is utilized to analyze transaction data records and create clusters corresponding to different crediting profiles, e.g. as described with reference to FIG. 9. Batches (clusters) of transaction data records, associated rules, and associated attribute values are created by a batch module (870). Clusters of data are assigned to different processes of a crediting engine (875), each of which perform a method to determine attribution weights, as described earlier.

Upon assignment of attribution weights and storage (880), it is determined whether the identified agent nodes are eligible for overlay credit (890). If it is determined that the identified agent nodes are eligible for overlay credit, the corresponding transaction data record is added to an overlay batch for processing and transaction profiling (865).

Figure 10:
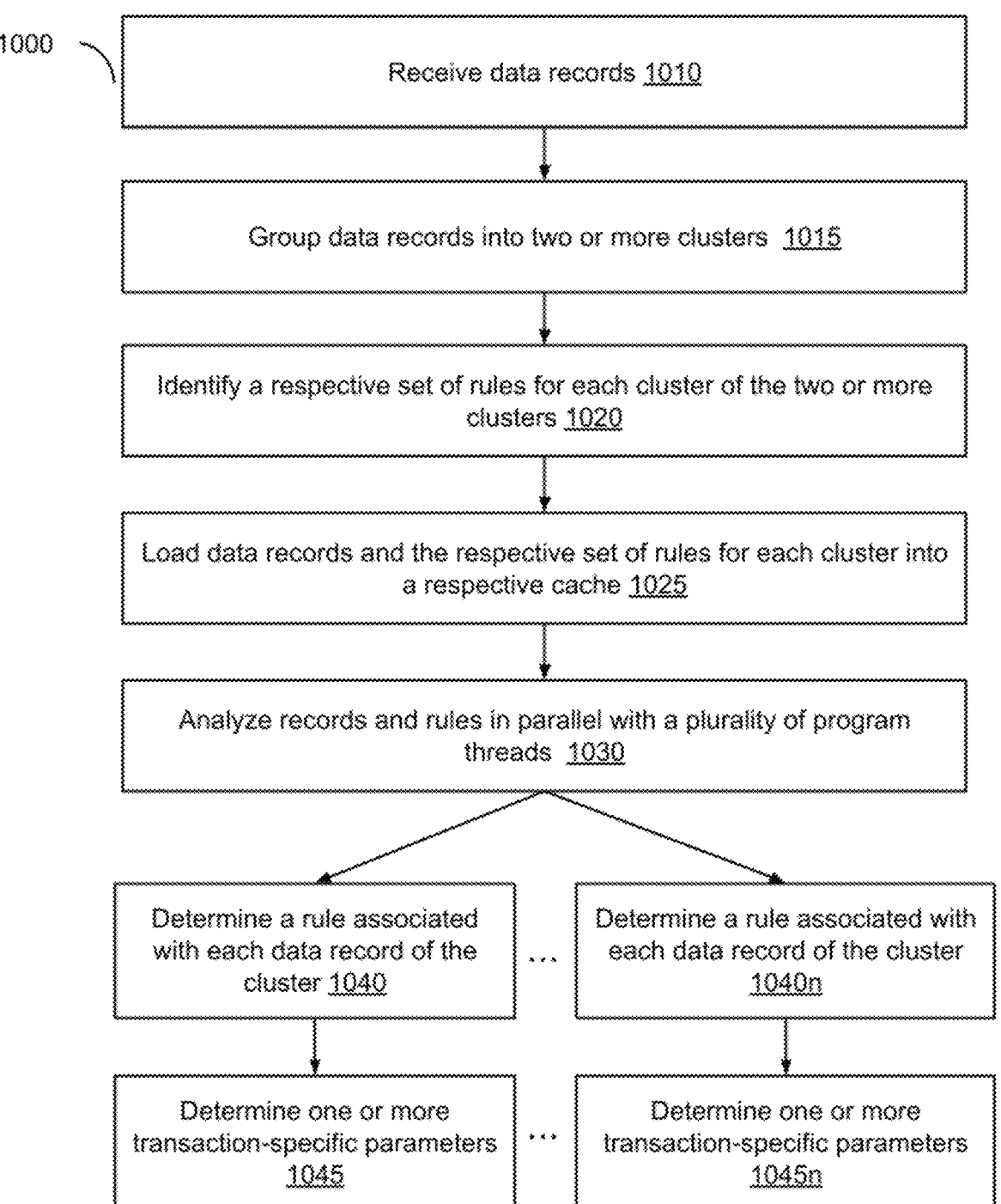
FIG. 10 is a flowchart illustrating an example method to determine one or more transaction-specific parameters based on a rule, in accordance with some implementations.

FIG. 10 is a flowchart illustrating an example method 1000 to determine one or more transaction-specific parameters based on a rule, in accordance with some implementations.

In some implementations, method 1000 can be implemented, for example, on processing system 130 described with reference to FIG. 1. In some implementations, some or all of the method 1000 can be implemented on one or more user systems 110 as shown in FIG. 1, on and/or on a combination of user systems and processing systems. In the described examples, the implementing system includes one or more digital processors or processing circuitry ("processors"), and one or more storage devices (e.g., databases 145, 150, or other storage). In some implementations, different components of one or more servers and/or clients can perform different blocks or other parts of the method 1000. In some examples, a first device is described as performing blocks of method 1000. Some implementations can have one or more blocks of method 1000 performed by one or more other devices (e.g., other client devices or server devices) that can send results or data to the first device.

In some implementations, the method 1000, or portions of the method, can be initiated automatically by a system. In some implementations, the implementing system is a first device. For example, the method (or portions thereof) can be periodically performed, or performed based on one or more particular events or conditions, e.g., reception of batch of data records, at a predetermined time, a predetermined time period having expired since the last performance of method 1000, and/or one or more other conditions occurring which can be specified in settings read by the method.

At block 1010, a plurality of data records are received, wherein each data record includes (e.g. is associated with, or contains a pointer to) a plurality of attribute values associated with a transaction. Processing continues to block 1015.

At block 1015, the plurality of data records are grouped into two or more clusters, wherein each cluster is associated with a respective set of attribute values, and wherein no two clusters share the same set of attribute values. Processing continues to block 1020.

At block 1020, a respective set of rules for each cluster of the two or more clusters are identified. Processing continues to block 1025.

At block 1025, the data records and the respective set of rules for each cluster are loaded into a respective cache. Processing continues to block 1030.

At block 1030, the data records are analyzed, in parallel with a plurality of program threads that execute on a respective processor associated with the respective cache and without accessing an external memory, such that the cache provides data locality, using the respective set of rules. The analysis includes performing blocks 1035 through 1045 in parallel using a plurality of program threads. Processing continues to block 1040.

At block 1040, a rule associated with each data record of the cluster based on a subset of attribute values in the data record that match a particular rule of a respective set of rules is determined. The respective set of rules are associated with a category and the set of categories are associated with a priority order and the sets of rules are evaluated in the priority order.

In some implementations, a comparison is made between a number of data records in the cluster and a number of rules in the set of rules associated with a category. Based on the comparison, if the number of data records in the cluster is greater than or equal to the number of rules, the rules are evaluated against the data records, else the data records are evaluated against the rules. This enables efficient parallelization of rules processing.

Processing continues to block 1045.

At block 1045, one or more transaction-specific parameters based on the rule are determined.

In some implementations, it may be determined that a profile associated with a first data record is a profile type that includes two or more embedded data records. If it is determined that the profile associated with the first data record is a category type that includes two or more embedded data records, the two or more embedded records are created and a subset of attribute values of the first data record are applied to the two or more embedded data records.

Figure 11:
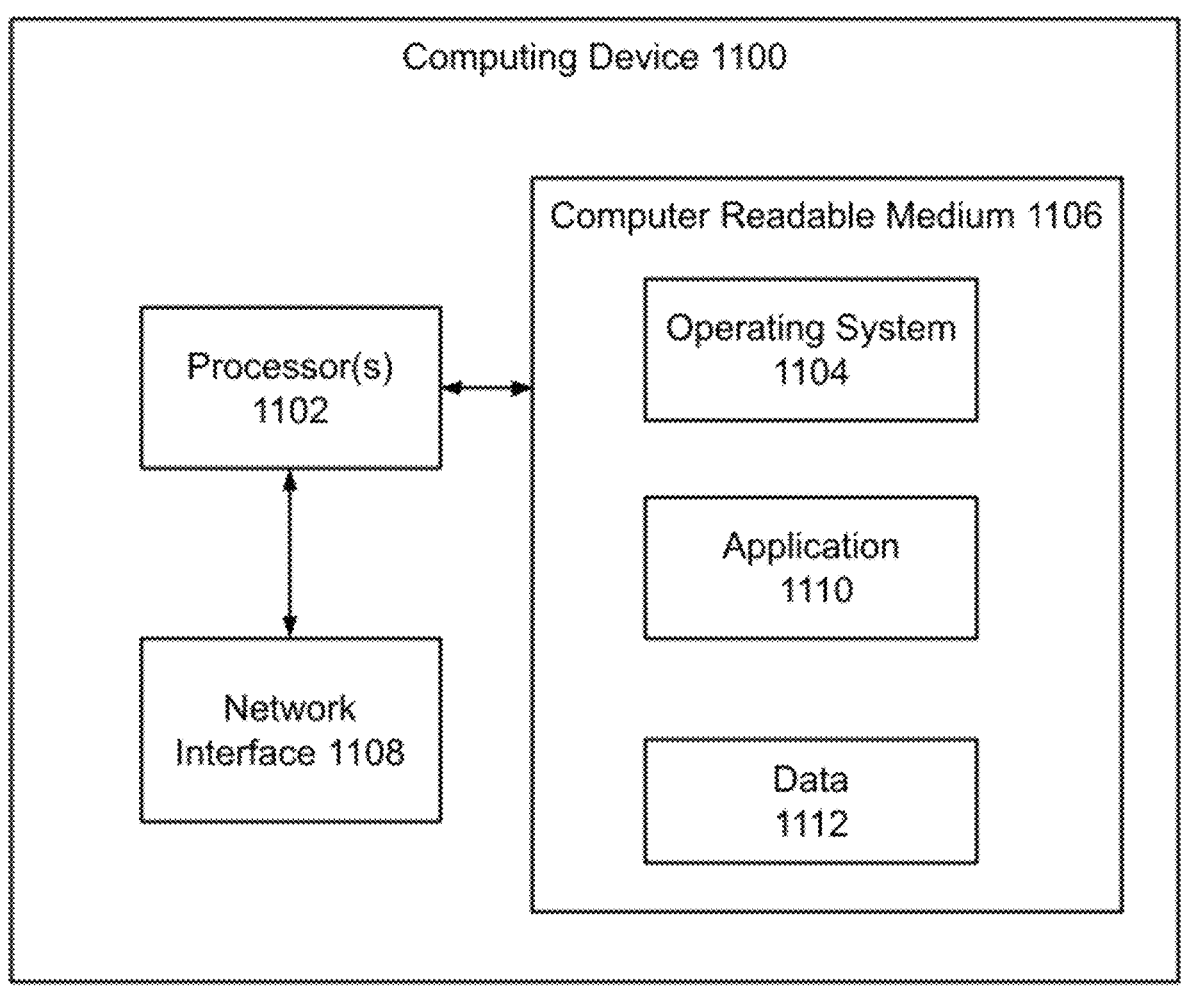
FIG. 11 is a block diagram illustrating an example computing device, in accordance with some implementations.

FIG. 11 is a block diagram of an example computing device 1100 which may be used to implement one or more features described herein. In one example, device 1100 may be used to implement a computer device (e.g. 130 and/or 120 of FIG. 1A), and perform appropriate method implementations described herein. Computing device 1100 can be any suitable computer system, server, or other electronic or hardware device. For example, the computing device 1100 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 1100 includes a processor 1102, a memory 1104, input/output (I/O) interface 1106, and audio/video input/output devices 1114.

Processor 1102 can be one or more processors and/or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Computer readable medium (memory) 1106 is typically provided in device 1100 for access by the processor 1102, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1104, one or more applications 1110 and application data 1112. In some implementations, application 1110 can include instructions that enable processor 1102 to perform the functions (or control the functions of) described herein, e.g., some or all of the methods described with respect to FIGS. 7 and 9.

Elements of software in memory 1106 can alternatively be stored on any other suitable storage location or computer-readable medium. In addition, memory 1106 (and/or other connected storage device(s)) can store instructions and data used in the features described herein. Memory 1106 and any other type of storage (magnetic disk, optical disk, magnetic tape, or other tangible media) can be considered "storage" or "storage devices."

An I/O interface can provide functions to enable interfacing the server device 1100 with other systems and devices. For example, network communication devices, storage devices (e.g., memory and/or data store 120), and input/output devices can communicate via the interface. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 11 shows one block for each of processor 1112, memory 1116. These blocks may represent one or more processors or processing circuitries, operating systems, memories, I/O interfaces, applications, and/or software engines. In other implementations, device 1100 may not have all of the components shown and/or may have other elements including other types of elements instead of, or in addition to, those shown herein. While the processing system 130 is described as performing operations as described in some implementations herein, any suitable component or combination of components of processing system 130 or similar system, or any suitable processor or processors associated with such a system, may perform the operations described.

A user device can also implement and/or be used with features described herein. Example user devices can be computer devices including some similar components as the device 1100, e.g., processor(s) 1102, memory 1106, etc. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices, for example, can be connected to (or included in) the device 1100 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 700, 740, 770, 800, and 1000) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:

receiving, at a processor, a file that includes a plurality of records associated with a hierarchy, wherein each record comprises an enumeration of first attributes and second attributes;

creating a database table based on the plurality of records;

determining a hierarchy graph based on the database table;

loading nodes associated with a predetermined number of levels of the hierarchy into memory;

displaying, on a user interface, a hierarchy graph that includes a plurality of nodes, wherein each of the nodes is associated with a corresponding data structure in the database table, wherein each of the nodes is associated with the first attributes and the second attributes, and wherein the hierarchy graph includes the nodes associated with the predetermined number of levels;

detecting an indication of a change to connectivity of a first node of the plurality of nodes;

in response to detecting the indication of the change to the connectivity of the first node, determining a change to the first attributes of one or more modified nodes of the plurality of nodes;

modifying the first attributes in a database that correspond to the one or more modified nodes; and displaying a modified hierarchy graph on the user interface.

2. The computer-implemented method of claim 1, wherein detecting the indication of the change comprises detecting an indication of an addition of a new node to the hierarchy graph.

3. The computer-implemented method of claim 1, wherein detecting the indication of the change comprises detecting a change in value of a parent node for the first node.

4. The computer-implemented method of claim 3, further comprising:

determining a modified parent value for the first node;

determining whether there is a change in a level associated with the first node;

based on a determination that there is a change in the level associated with the first node, adjusting a current level of the first node; and recursively adjusting a level of all nodes at levels lower than a level of the first node.

5. The computer-implemented method of claim 1, further comprising prior to displaying the hierarchy graph:

validating the plurality of records included in the file.

6. The computer-implemented method of claim 1, wherein loading the nodes comprises loading into memory the first attributes of a predetermined number of levels of nodes.

7. The computer-implemented method of claim 1, further comprising:

detecting a selection of a second node of the nodes included in the displayed modified hierarchy graph;

loading, into memory, the second attributes associated with the selected second node;

loading, into the memory, the first attributes of a next lower level of nodes;

displaying graphically the lower level of nodes; and displaying, on a text window, the second attributes of the selected second node.

8. The computer-implemented method of claim 7, wherein loading the second attributes associated with the selected second node occurs by overwriting the second attributes in memory of a previously selected node with the attributes of the selected second node.

9. A system comprising:

a memory with instructions stored thereon; and a processing device, coupled to the memory, the processing device configured to access the memory and execute the instructions, wherein the instructions cause the processing device to perform operations comprising:

receiving, at a processor, a file that includes a plurality of records associated with a hierarchy, wherein each record comprises an enumeration of first attributes and second attributes;

creating a database table based on the plurality of records;

determining a hierarchy graph based on the database table;

loading nodes associated with a predetermined number of levels of the hierarchy into memory;

displaying, on a user interface, a hierarchy graph that includes a plurality of nodes, wherein each of the nodes is associated with a corresponding data structure in the database table, wherein each of the nodes is associated with the first attributes and the second attributes, and wherein the hierarchy graph includes the nodes associated with the predetermined number of levels;

detecting an indication of a change to connectivity of a first node of the plurality of nodes;

in response to detecting the indication of the change to the connectivity of the first node, determining a change to the first attributes of one or more modified nodes of the plurality of nodes;

modifying the first attributes in a database that correspond to the one or more modified nodes; and displaying a modified hierarchy graph on the user interface.

10. The system of claim 9, wherein detecting the indication of the change comprises detecting an indication of an addition of a new node to the hierarchy graph.

11. The system of claim 9, wherein detecting the indication of the change comprises detecting a change in value of a parent node for the first node.

12. The system of claim 11, wherein the operations further comprise:

determining a modified parent value for the first node;

determining whether there is a change in a level associated with the first node;

based on a determination that there is a change in the level associated with the first node, adjusting a current level of the first node; and recursively adjusting a level of all nodes at levels lower than a level of the first node.

13. The system of claim 9, wherein the operations further comprise:

validating the plurality of records included in the file.

14. The system of claim 9, wherein the operations further comprise:

detecting a selection of a second node of the nodes included in the displayed hierarchy graph;

loading, into memory, the second attributes associated with the selected second node;

loading, into the memory, the first attributes of a next lower level of nodes;

displaying graphically the lower level of nodes; and displaying, on a text window, the second attributes of the selected second node.

15. A non-transitory computer-readable medium with instructions stored thereon that, responsive to execution by a processing device, cause the processing device to perform operations comprising:

receiving, at a processor, a file that includes a plurality of records associated with a hierarchy, wherein each record comprises an enumeration of first attributes and second attributes;

creating a database table based on the plurality of records;

determining a hierarchy graph based on the database table;

loading nodes associated with a predetermined number of levels of the hierarchy into memory;

displaying, on a user interface, a hierarchy graph that includes a plurality of nodes, wherein each of the nodes is associated with a corresponding data structure in the database table, wherein each of the nodes is associated with the first attributes and the second attributes, and wherein the hierarchy graph includes the nodes associated with the predetermined number of levels;

detecting an indication of a change to connectivity of a first node of the plurality of nodes;

in response to detecting the indication of the change to the connectivity of the first node, determining a change to the first attributes of one or more modified nodes of the plurality of nodes;

modifying the first attributes in a database that correspond to the one or more modified nodes; and displaying a modified hierarchy graph on the user interface.

16. The non-transitory computer-readable medium of claim 15, wherein detecting the indication of the change comprises detecting an indication of an addition of a new node to the hierarchy graph.

17. The non-transitory computer-readable medium of claim 15, wherein detecting the indication of the change comprises detecting a change in value of a parent node for the first node.

18. The non-transitory computer-readable medium of claim 17, wherein the operations further comprise:

determining a modified parent value for the first node;

determining whether there is a change in a level associated with the first node;

based on a determination that there is a change in the level associated with the first node, adjusting a current level of the first node; and recursively adjusting a level of all nodes at levels lower than a level of the first node.

19. The non-transitory computer-readable medium of claim 15, wherein the operations further comprise:

validating the plurality of records included in the file.

20. The non-transitory computer-readable medium of claim 15, wherein the operations further comprise:

detecting a selection of a second node of the nodes included in the displayed hierarchy graph;

loading, into memory, the second attributes associated with the selected second node;

loading, into the memory, the first attributes of a next lower level of nodes;

displaying graphically the lower level of nodes; and displaying, on a text window, the second attributes of the selected second node.

* * * * *